United States Patent
Whiffen et al.

(10) Patent No.: US 12,495,841 B2
(45) Date of Patent: Dec. 16, 2025

(54) METHOD AND APPARATUS FOR MANUFACTURING A CONSUMABLE UNIT FOR AN INHALATION DEVICE

(71) Applicant: BRITISH AMERICAN TOBACCO (INVESTMENTS) LIMITED, London (GB)

(72) Inventors: Sam Whiffen, London (GB); Andrew Bray, London (GB)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 139 days.

(21) Appl. No.: 18/006,882

(22) PCT Filed: Jul. 29, 2021

(86) PCT No.: PCT/GB2021/051964
§ 371 (c)(1),
(2) Date: Jan. 26, 2023

(87) PCT Pub. No.: WO2022/023758
PCT Pub. Date: Feb. 3, 2022

(65) Prior Publication Data
US 2023/0276861 A1    Sep. 7, 2023

(30) Foreign Application Priority Data

Jul. 30, 2020 (GB) .................................... 2011887

(51) Int. Cl.
*A24F 40/70* (2020.01)
*A24F 40/20* (2020.01)
(Continued)

(52) U.S. Cl.
CPC .............. *A24F 40/70* (2020.01); *B26D 7/015* (2013.01); *B26F 1/44* (2013.01); *B65B 7/01* (2013.01);
(Continued)

(58) Field of Classification Search
CPC .......... A24F 40/70; A24F 40/20; A24F 40/42; B26D 7/015; B26F 1/44; B26F 2001/4481; B65B 7/01; B65B 7/28; B30B 15/06
See application file for complete search history.

(56) References Cited

U.S. PATENT DOCUMENTS

| 1,154,245 | A | * | 9/1915 | Graham | ................. B21D 51/46 413/64 |
| RE14,708 | E | * | 8/1919 | Graham | .......................... 413/64 |

(Continued)

FOREIGN PATENT DOCUMENTS

| CN | 106077348 | A | * | 11/2016 | | |
| GB | 2407085 | A | * | 4/2005 | ............. | B21D 51/44 |

(Continued)

OTHER PUBLICATIONS

"International Search Report and Written Opinion received for PCT Patent Application No. PCT/GB2021/051964, mailed on Nov. 22, 2021", 12 pages.

*Primary Examiner* — Lucas E. A. Palmer
(74) *Attorney, Agent, or Firm* — MERCHANT & GOULD P.C

(57) ABSTRACT

Apparatus for positioning a sub component on a consumable unit for use with an inhalation device including a machine tray support for locating a machine tray of consumable units arranged in an array; a clamp holding a support web including an array of sub components in a position above the machine tray support; and a punch having protrusions configured to engage the array of sub components by displace- (Continued)

ment of the punch toward the machine tray support to separate the sub components from the support web and locate the sub components on the consumable units, wherein the protrusions include a first protrusion having a first height and a second protrusion having a second height, the second height being greater than the first height, so that the second protrusion engages a sub component before the first protrusion engages a sub component when the punch moves toward the machine tray support.

16 Claims, 16 Drawing Sheets

(51) Int. Cl.
- *A24F 40/42* (2020.01)
- *B26D 7/01* (2006.01)
- *B26F 1/44* (2006.01)
- *B30B 15/06* (2006.01)
- *B65B 7/01* (2006.01)
- *B65B 7/28* (2006.01)

(52) U.S. Cl.
CPC ............... *B65B 7/28* (2013.01); *A24F 40/20* (2020.01); *A24F 40/42* (2020.01); *B26F 2001/4481* (2013.01); *B30B 15/06* (2013.01)

(56) References Cited

U.S. PATENT DOCUMENTS

| | | | | |
|---|---|---|---|---|
| 2,622,682 A * | 12/1952 | Kopczynski | ........... | B21D 28/34 83/686 |
| 2,808,108 A * | 10/1957 | Pellegrino | ........... | B21D 28/346 83/699.41 |
| 3,112,590 A * | 12/1963 | O'Brien | ........... | B65B 51/18 53/329.5 |
| 3,248,977 A * | 5/1966 | Schneider | ........... | B26F 1/02 83/519 |
| 3,334,809 A * | 8/1967 | Zajic et al. | ........... | G06K 1/02 144/196 |
| 3,848,495 A * | 11/1974 | Youra | ........... | B26F 1/44 269/297 |
| 4,030,390 A * | 6/1977 | Heiting | ........... | B26D 7/015 83/563 |
| 4,065,908 A * | 1/1978 | Mueller | ........... | B65B 7/168 53/138.1 |
| 4,065,909 A * | 1/1978 | Mueller | ........... | B65D 51/20 53/129.1 |
| 4,228,709 A * | 10/1980 | Guzay, Jr. | ........... | H02G 1/005 29/564.6 |
| 4,898,056 A * | 2/1990 | Grobb | ........... | B26F 1/14 83/622 |
| 5,303,618 A * | 4/1994 | Norell | ........... | H05K 3/005 83/687 |
| 5,517,888 A * | 5/1996 | Ray | ........... | B26D 7/025 83/620 |
| 5,697,273 A * | 12/1997 | Tsuzaki | ........... | B26F 1/04 83/48 |
| 6,408,728 B1 * | 6/2002 | Tsuji | ........... | B26F 1/02 83/687 |
| 6,606,926 B1 * | 8/2003 | Tsuji | ........... | H05K 3/005 83/13 |
| 6,766,723 B2 * | 7/2004 | Yasoda | ........... | B26F 1/04 83/683 |
| 6,877,408 B2 * | 4/2005 | Kubota | ........... | B26D 5/08 83/530 |
| 9,623,582 B2 * | 4/2017 | Mori | ........... | B26F 1/14 |
| 2005/0081695 A1 * | 4/2005 | Lee | ........... | B26F 1/14 83/687 |
| 2015/0289565 A1 * | 10/2015 | Cadieux | ........... | A24F 40/80 131/328 |
| 2019/0240856 A1 * | 8/2019 | Saho | ........... | B26F 1/44 |
| 2022/0111544 A1 * | 4/2022 | Staudinger | ........... | B26D 5/12 |

FOREIGN PATENT DOCUMENTS

| | | | | |
|---|---|---|---|---|
| GB | 2430668 A * | 4/2007 | ........... | B65D 47/103 |
| KR | 10-2019-0000153 A | 1/2019 | | |
| TW | 201400039 A * | 1/2014 | ........... | A24B 15/16 |
| WO | WO-2016045084 A1 * | 3/2016 | ........... | A24F 47/00 |
| WO | WO-2016123761 A1 * | 8/2016 | ........... | A24F 47/00 |

* cited by examiner

METHOD AND APPARATUS FOR MANUFACTURING A CONSUMABLE UNIT FOR AN INHALATION DEVICE

PRIORITY CLAIM

The present application is a National Phase entry of PCT Application No. PCT/GB2021/051964, filed Jul. 29, 2021, which claims priority from GB Application No. 2011887.3, filed Jul. 30, 2020, each of which are hereby fully incorporated herein by reference.

FIELD

The present invention relates to an apparatus and a method for manufacturing a consumable unit for an inhalation device, in particular but not limited to an apparatus and a method for manufacturing a tobacco pod that contains a particulate tobacco material for use in an inhalation device.

BACKGROUND

There exists a need to provide an apparatus and a method for the efficient manufacture of consumable units for inhalation devices which may involve providing a dose of aerosolizable material to a pod of the consumable unit; positioning a closure over an end of the pod; and securing the closure to the pod. These, and other manufacturing steps, may need to be carried out on a plurality of pods in quick succession.

SUMMARY

In accordance with embodiments of the invention, there is provided apparatus for positioning a sub component on a consumable unit for use with an inhalation device, the apparatus comprising:
  a machine tray support for locating a machine tray of consumable units, the consumable units being arranged in an array in the machine tray;
  a clamp for holding a support web comprising an array of sub components in a position above the machine tray support; and
  a punch having an array of protrusions configured to engage the array of sub components by displacement of the punch toward the machine tray support to separate the sub components from the support web and locate the sub components on the consumable units, wherein the protrusions comprise a first protrusion having a first height and a second protrusion having a second height, the second height being greater than the first height, so that the second protrusion engages a sub component before the first protrusion engages a sub component when the punch moves toward the machine tray support.

An actuator may be arranged to move the punch toward the machine tray support.

The clamp may be provided on a platform, the platform being slidably mounted relative to the machine tray support between an engaged position and a disengaged position, in which a machine tray is insertable into, or is removable from, the machine tray support.

The clamp may comprise a support surface having an array of apertures that correspond to the array of protrusions, so that, the protrusions are moveable into the apertures to separate sub components from a support web held by the clamp by pushing the sub components through the apertures.

The support surface may comprise an alignment element associated with each aperture, each alignment element being configured to engage a corresponding consumable unit or the machine tray to adjust for any misalignment between the consumable unit and a corresponding sub component of the support web when the platform is in the engaged position.

Each alignment element may comprise a chamfer of a lower edge of each aperture.

The platform may be mounted on a pillar for linear movement between the engaged and disengaged positions.

The platform may be supported by four pillars arranged around the machine tray support.

The machine tray support may comprise one or more rails configured to support opposing sides of the machine tray so that the machine tray can be inserted into the machine tray support by sliding the machine tray along said rails.

The machine tray support may include a stop against which the machine tray abuts when inserted into a predetermined position.

The actuator may be configured to move the platform between the engaged and disengaged positions.

The machine tray support may further comprise a proximity switch to determine when the machine tray is located in the predetermined position The protrusions may comprise a first group of protrusions having a first height and a second group of protrusions having a second height, the second height being greater than the first height.

The array of protrusions may comprise rows of protrusions, wherein each row of protrusions differs in height from a directly adjacent row.

A distribution of the first group of protrusions in the array of protrusions may overlap a distribution of the second group of protrusions in the array of protrusions.

The distribution of the first group of protrusions may at least partially enclose at least one protrusion of the second group of protrusions, or alternatively the distribution of the second group of protrusions may at least partially enclose at least one of the protrusions of the first group of protrusions In accordance with embodiments of the invention, there is provided a punch having an array of protrusions configured to engage an array of sub components in a support web by displacement of the punch toward the support web to separate the sub components from the support web, wherein the protrusions comprise a first protrusion having a first height and a second protrusion having a second height, the second height being greater than the first height, so that the second protrusion engages a sub component before the first protrusion engages a sub component when the punch moves toward the support web.

In accordance with embodiments of the invention, there is provided a method of positioning a sub component on a consumable unit for use with an inhalation device, the method comprising:
  locating a machine tray of consumable units a machine tray support, the consumable units being held in an array in the machine tray;
  clamping a support web comprising an array of sub components in a position above the machine tray support; and
  operating a punch having an array of protrusions configured to engage the array of sub components by displacing of the punch toward the machine tray support to separate the sub components from the support web and locate the sub components on the consumable units held in the machine tray, wherein the heights of the protrusions vary to stagger engagement of the protrusions with the sub components as the punch moves toward the support web.

BRIEF DESCRIPTION OF THE DRAWINGS

Embodiments of the invention will be described, by way of example only, with reference to the accompanying drawings, in which.

DETAILED DESCRIPTION

This patent specification discloses apparatuses and methods for manufacturing consumable units for inhalation devices. In particular, this patent specification discloses apparatuses and methods for manufacturing consumable units for the delivery of vapor generated without combustion in an inhalation device.

In an embodiment disclosed herein, an inhalation device comprises: an operating unit of a size and shape suitable to be held by an adult consumer; an atomizer cartridge that is removably attachable to the operating unit, the atomizer cartridge having an atomizer for atomizing a consumable liquid held in the cartridge; a tobacco pod that is removably attachable to the cartridge, the tobacco pod having a container and a mouthpiece, the container containing a charge of aerosolizable material for example a particulate tobacco material; and a closure for retaining the particulate tobacco material within the container.

The user is able to change the atomizer cartridge and the tobacco pod individually when they need replacement, i.e. when the consumable liquid runs out, or when tobacco in the tobacco pod runs out.

In use, the operating unit delivers energy to the atomizer cartridge under the control of the consumer as the consumer draws air through the inhalation device. The liquid in the atomizer cartridge is atomized to form an aerosol and the particulate tobacco material in the tobacco pod is volatilized, releasing volatile flavors. The air inhaled from the inhalation device therefore delivers an aerosol of atomized liquid from the atomizer cartridge to the consumer together with the vapor generated by heating the particulate tobacco material in the tobacco pod. The compositions of the vaporisable tobacco material and the consumable liquid may be selected to deliver a wide combination of flavors that appeal to the consumer.

This specification is directed to apparatus and methods for manufacture of the tobacco pod for the inhalation device, as described above. However, it will be appreciated that in alternative inhalation devices the particulate tobacco material may be replaced with an alternative particulate vaporizable material. For example, the particulate vaporizable material may be a particulate botanical material. The apparatus and methods described hereinafter are not limited by the particulate material in the tobacco pod, and so the tobacco pod will be referred to as a consumable unit that contains a particulate material.

Figure 1:
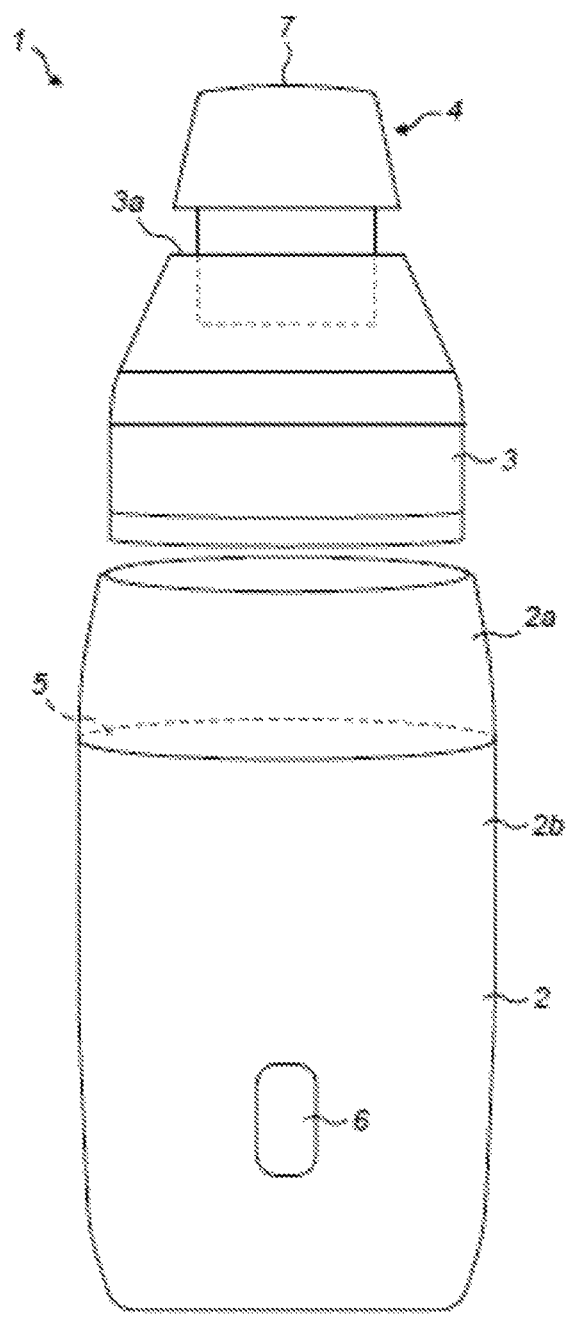
FIG. 1 shows an inhalation device that includes a consumable unit.

Referring to FIG. 1, the inhalation device 1 has three hollow sections of moulded plastics materials: a body 2, containing an operating system and mechanism for device, an atomizer cartridge 3, containing a volatilizable liquid flavorant, and a consumable unit 4 containing a dose of particulate material which generates an aerosol when heated. The three sections are removably connected to each other so that the atomizer cartridge 3 and the consumable unit 4 can each disconnect from each other and the body 2, to allow replacement consumable units 4 and atomizer cartridges 3 to be fitted to the body 2.

The body 2 is of a generally cylindrical shape that is elongated in an axial direction and flattened so as to be held comfortably in the hand of an adult consumer. The body 2 is formed from two axially-aligned, hollow moulded sections, an upper section 2a and a lower section 2b. The upper section 2a of the body 2 has an open upper end and a closed lower end wall 5 that define a recess for receiving the atomizer cartridge 3. The lower section 2b of the body is closed off from the upper section 2a by the lower end wall 5 of the upper section 2a to provide a firewall. The lower section 2b of the body 2 contains a battery, an electronic circuit board, a puff sensor and other operating components, not illustrated here, which may be activated by an operating button 6 in one face of the body 1. Electrical lights housed in apertures in the body 2 indicate the state of operation of the inhalation device 1.

The atomizer cartridge 3 is removably connected to the body 2 by a push fit connection into the recess in the upper body section 2a, and tapers in the axial direction away from the body 2 towards an upper outlet 3a of the atomizer cartridge 3. The atomizer cartridge 3 contains a reservoir filled with volatilizable liquid flavorant and a heating element for volatilising the liquid to which the supply of electricity may be controlled from the battery in the body 2 by the operating button 6.

The consumable unit 4 is removably connected to the atomizer cartridge 3 by a push fit connection into the upper outlet 3a of the atomizer cartridge 3. The external surface of the consumable unit 4 forms a skirt that continues the tapering shape of the atomizer cartridge 3 in the axial direction towards a vapor outlet 7, which is shaped to be held comfortably in the mouth of the consumer.

Figure 2A:
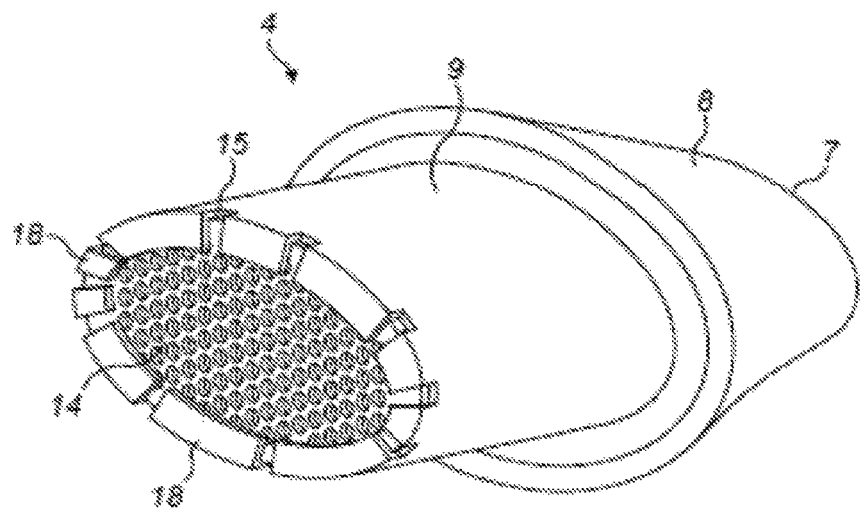
FIGS. 2A and 2B show a consumable unit of the inhalation device of FIG. 1.
Figure 2B:
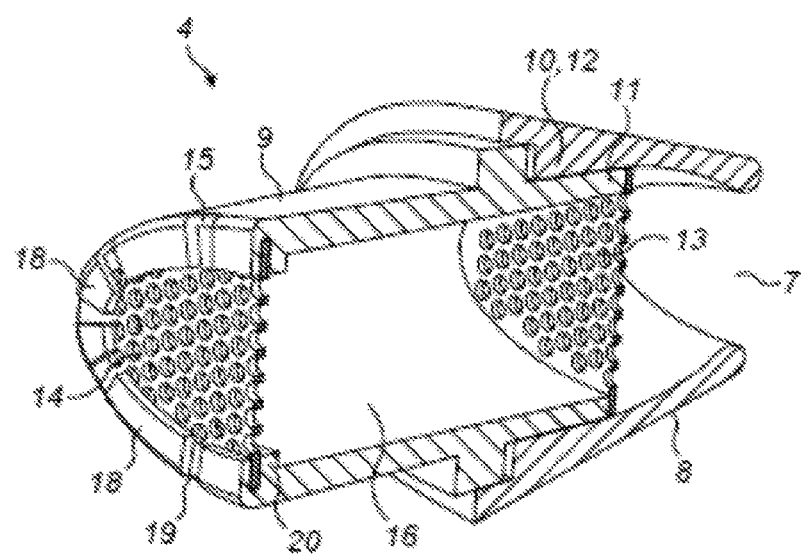

As shown in FIGS. 2A and 2B, the consumable unit 4 comprises a mouthpiece 8 and an axially-extending open-ended container 9. In this example, the container 9 has an elliptical radial cross-section. One end of the container 9 lies within a skirt 10 of the mouthpiece 8 and terminates in a spigot 11, which is received within a socket 12 of complimentary shape formed on the interior surface of the mouthpiece 8 upstream of the vapor outlet 7.

The mouthpiece 8 may be connected to the container 9 by ultrasonic welding, induction welding or any other suitable method. Alternatively, the mouthpiece 8 and container 9 may be integrally formed, for example by injection moulding.

An inner perforated screen 13, which in this embodiment is moulded integrally with the container 9, extends radially across the container 9 to define a vapor permeable partition across the container 9 a short distance upstream of the vapor outlet 7. As shown in FIG. 2B, the inner perforated screen 13 extends across the inner end of the container 9. The other end 15 of the container 9 projects from the skirt 10 of the mouthpiece 8 and is provided with a closure 14. In this example, the closure 14 is in the form of a perforated screen. The closure 14 is composed for example of a mesh or foil or a moulding of plastics material.

In alternative examples, the inner perforated screen 13 is integrally moulded to the mouthpiece 8, and is positioned across the end of the container 9 when the mouthpiece 8 and container 9 are combined.

The inner perforated screen 13 and the closure 14 define end walls of a chamber 16 within the container 9 in which a dose of particulate material is held. Perforations in the inner perforated screen 13 and the closure 14 allow vapor to pass in the axial direction downstream through the chamber 16 towards the mouthpiece 8 and vapor outlet 7. The perforations are of a size that is selected in relation to the particle size of the particulate material to prevent particles from falling from the container 9, or being drawn into the mouthpiece 8 with inhaled vapor.

In use, the consumer switches on the inhalation device 1 using the operating button 6, sucks through the mouthpiece 8 and inhales the vapor drawn from the inhalation device 1. When activated, the electronic system within the body 2 heats the air in the inhalation device 1 and the liquid in the atomizer cartridge 3 sufficiently to cause atomization. The heated air volatilizes flavorants from the particulate material within the container 9 and also entrains atomized liquid flavorant from the atomizer cartridge 3. A combination of flavorants is thereby delivered to the consumer as an aerosol for inhalation.

Figure 3A:
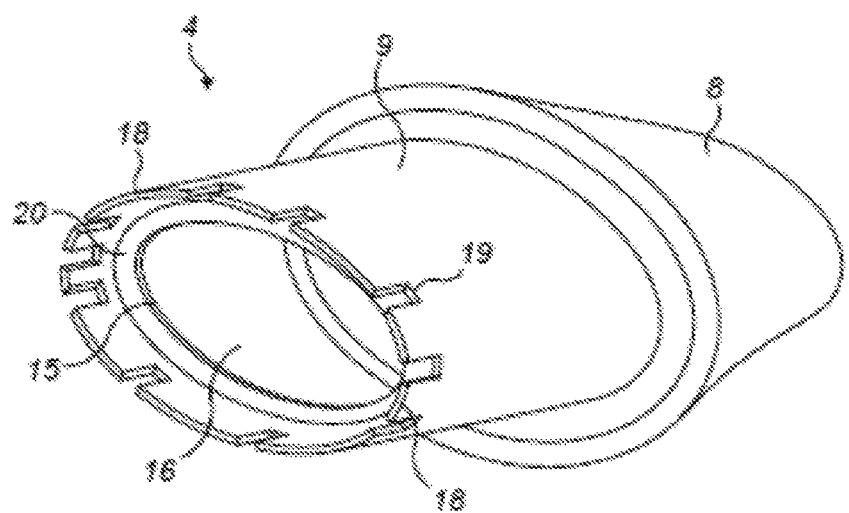
FIG. 3A shows the consumable unit of FIGS. 2A and 2B, with the closure removed.
Figure 3B:
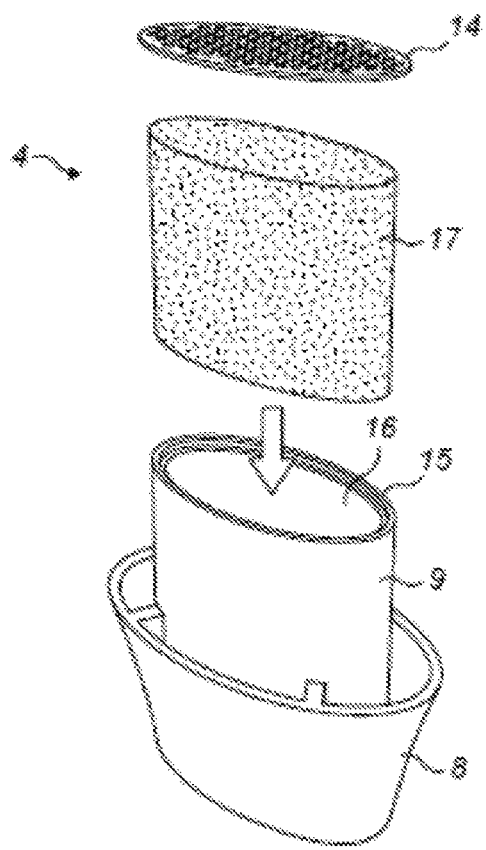
FIG. 3B shows a schematic drawing of the consumable unit of FIG. 3A being provided with a particulate material and a closure.

The method of manufacturing the consumable unit 4 includes receiving the empty consumable unit illustrated in FIG. 3A, in which the chamber 16 is empty and the closure 14 is not present, so that the end 15 of the chamber 16 is open. The method, schematically illustrated in FIG. 3B, includes providing the chamber 16 with a dose of particulate material 17 through the open end 15 of the chamber 9, positioning a closure 14 over the end 15 of the chamber 16, and then securing the closure 14 to the container 9. As shown in FIG. 3A, the container 9 includes a plurality of stakes 18 that initially protrude axially from the end 15 of the container 9. The closure 14 is received between these stakes 18, and as shown in FIGS. 2A and 2B, the stakes 18 are then bent over onto the closure 14 to secure the closure 14 to the container 9.

Specifically, as shown in FIG. 3A, the container 9 that defines the chamber 16 comprises an end 15 and the stakes 18 protrude axially from a radial edge 19 of the end 15 such that a lip 20 is defined at the end of the container 9. As shown in FIG. 2B, the closure 14 is positioned against the lip 20, and the stakes 18 are bent over onto the outside of the closure 14, thereby securing the closure 14 to the container 9.

As illustrated, the stakes 18 are spaced apart about the radial edge 19 of the container 9, and the gaps between the stakes 18 allow them to be folded over without clashing. The stakes 18 can have different sizes (widths). Narrower stakes 18 are preferably positioned at parts of the radial edge 19 of the container 9 with a smaller radius, so that the stakes 18 can more easily be bent over, as there will be lower stress and strain at the point where the stakes 18 are bent.

Figure 4:
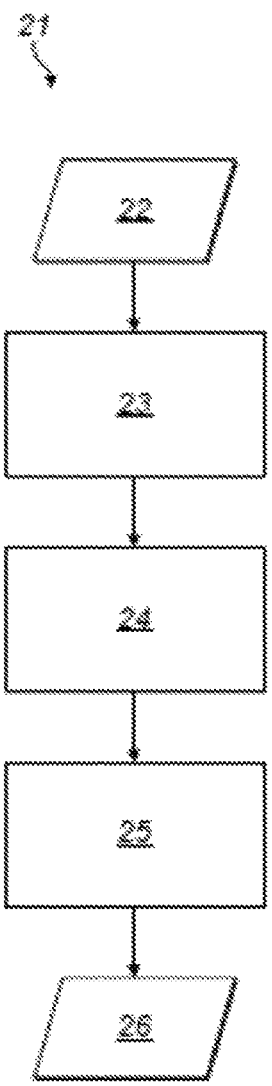
FIG. 4 shows a schematic diagram of apparatus for manufacturing the consumable unit of FIGS. 2A and 2B.

FIG. 4 shows a schematic diagram of apparatus 21 for manufacturing the consumable unit 4 described with reference to FIGS. 2A to 3B, in particular the consumable unit 4 that includes a mouthpiece 8 and a container 9 that holds a particulate material 17. The illustrated apparatus 21 includes apparatus for carrying out the following method steps:

dosing particulate material 17 into the chamber 16 of a consumable unit 4, positioning a closure 14 on the container 9 of the consumable unit 4, and securing the closure 14 to the container 9.

As shown in FIG. 4, a first step is an input 22 of empty consumable units 4. The consumable units 4 at input 22 are in the form illustrated in FIG. 3A. In particular, an empty consumable unit 4 at input 22 comprises a mouthpiece 8 and a container 9 having an open end 15. The container 9 includes stakes 18 that protrude as shown in FIG. 3A, for securing the closure 14 after particulate material 17 has been placed in the chamber 16.

After input 22 of the empty consumable units 4 a dosing station 23 provides a dose of particulate material 17 to the chamber 16 of the consumable unit 4. Next, a closure positioning station 24 positions a closure 14 over the end 15 of the container 9. Then, a closure securing station 25 secures the closure 14 to the container 9. In particular, the closure securing station 25 bends the stakes 18 over against the closure 14 to secure the closure 14 to the container 9 as shown in FIGS. 2A and 2B. Complete consumable units 4, as shown in FIGS. 2A and 2B, with particulate material 17, and then output 26 from the apparatus 21.

In the described apparatus 21 the dosing station 23, closure positioning station 24, and closure securing station 25 are each separate and arranged adjacent to each other, and the consumable units 4 can moved sequentially between the stations 23, 24, 25. The consumable units 4 may be moved manually, or they may be moved on a conveyor. Use of conveyor may allow automated manufacture. The conveyor may, for example, be a so-called 'smart conveyor' that allows independent control of individual vehicles along a track of the conveyor. An example of such a conveyor is the XTS range of conveyors from Beckhoff. In examples that employ use of a conveyor, the dosing station 23, closure positioning station 24, and closure securing station 25 can be arranged such that the consumable units 4 move in a straight line through the dosing station 23, the closure positioning station 24, and the closure securing station 25.

In other examples, the dosing station 23, closure positioning station 24, and closure securing station 25 can be arranged around a single location where the consumable units 5 are placed, and each station 23, 24, 25 can perform its function on the consumable units 4 sequentially. In yet further examples, one or more of the stations 23, 24, 25 may be combined so that a single station has tooling to perform one or more of the processes described with reference to FIG. 4. For example, tooling for one or more of the dosing station 23, closure positioning station 24, and closure securing station 25 may be arranged on a rotating turret and the consumable units 4 placed beneath the turret, which rotates to align each part of the tooling.

Each of the dosing station 23, closure positioning station 24, and closure securing station 25 will now be described in further detail.

Figure 5A:
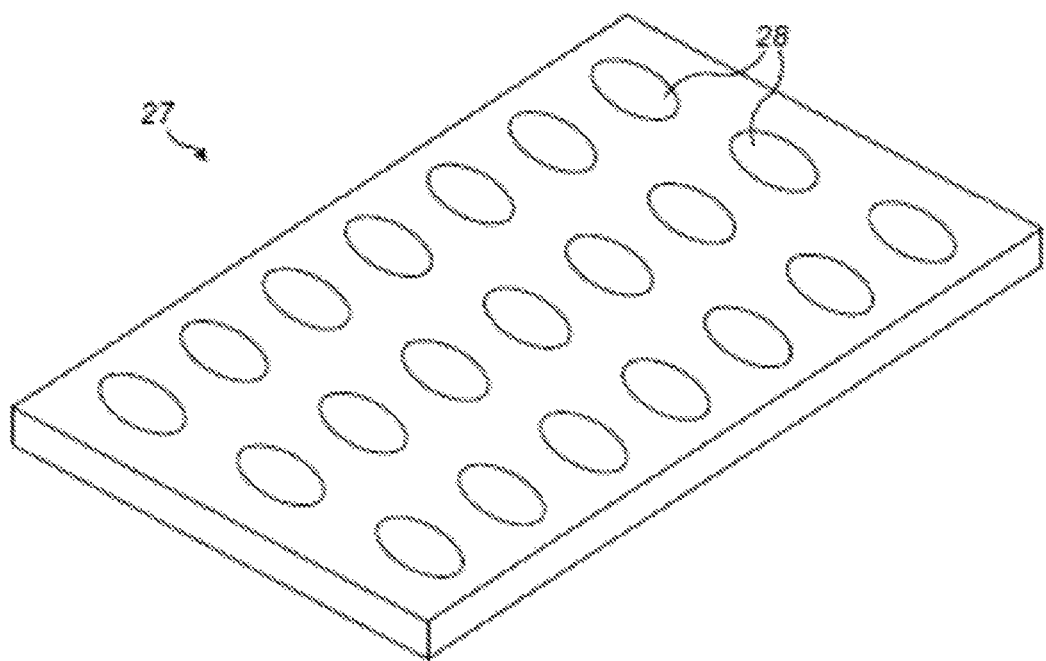
FIGS. 5A and 5B show a machine tray for supporting consumable units through the apparatus of FIG. 4.
Figure 5B:
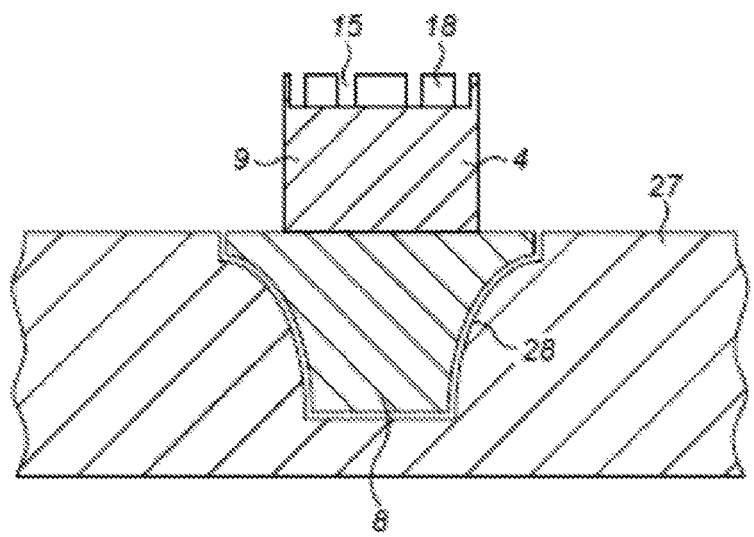

FIG. 5A and FIG. 5B illustrate a machine tray 27 that holds a plurality of consumable units 4. The machine tray 27 is provided with a plurality of empty consumable units 4 at the input 22 of the apparatus 21, and the machine tray 27 is then moved through the apparatus 21 described with reference to FIG. 4 so that the consumable units 4 are provided with a dose of particulate material 17 and the closures 14 are positioned and secured while the consumable units 4 are held in the machine tray 27.

The machine tray 27 holds the consumable units 4 in an upright orientation, with the open end 15 of the containers 9 directed vertically upwards so that they can be provided with particulate material 17 and the closure 14 can be positioned and secured. As shown in FIG. 5A, the machine tray 27 includes an array of supporting recesses 28, each of which is shaped to receive and support a consumable unit 4. In particular, as shown in FIG. 5B, each supporting recess 28 is shaped to receive and support the mouthpiece 8 of a consumable unit 4 so that the open end 15 of the container 9 is directed upwards.

Optionally, the machine tray 27 may include one or more handles for manual lifting and moving of the machine tray 27. Alternatively, if the apparatus 21 includes a conveyor, as previously described, the machine tray 27 may be mounted to the conveyor for movement through the apparatus 21. The machine tray 27 may be detachably mounted to such a conveyor.

Figure 6A:
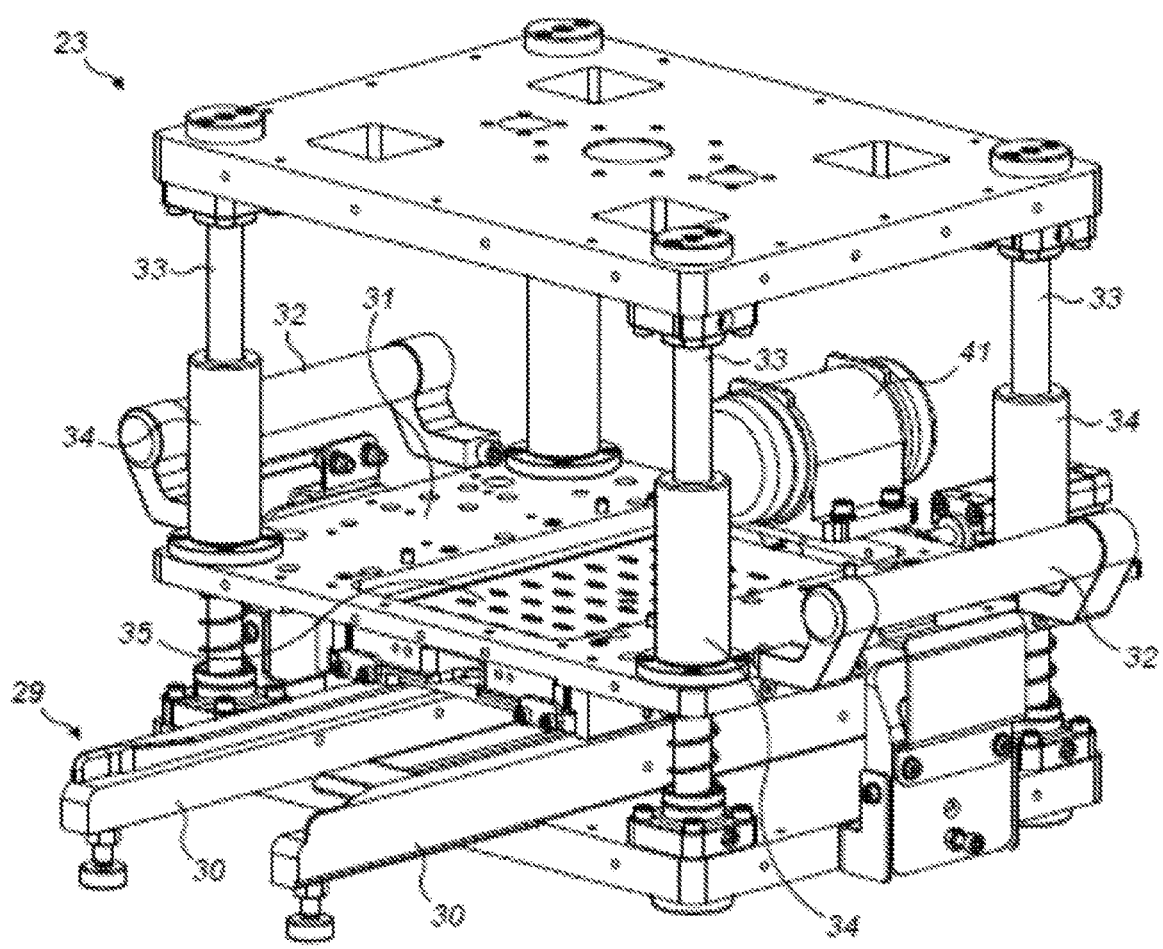
FIGS. 6A and 6B show a dosing station for providing consumable units with particulate material.
Figure 6B:
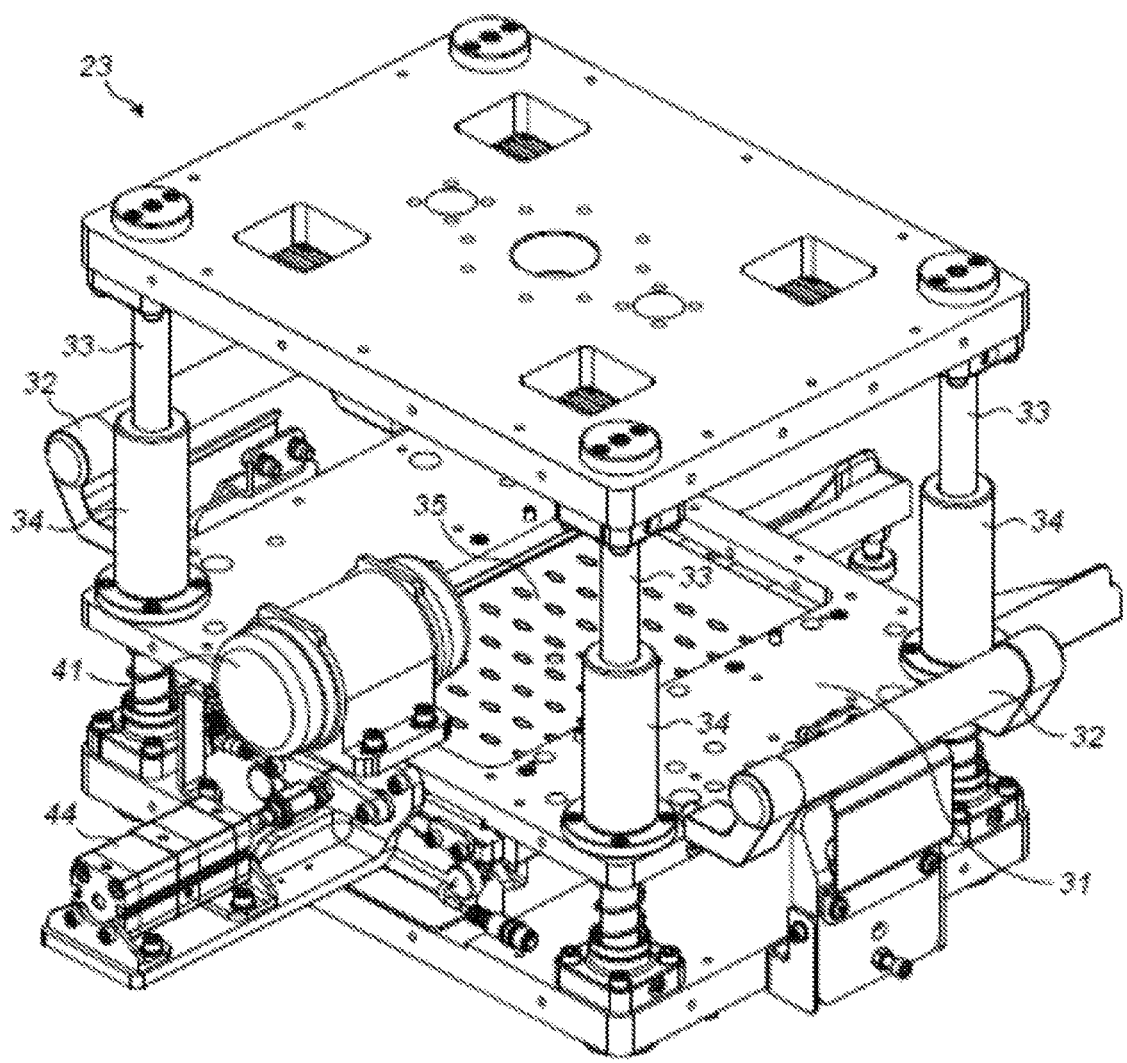

FIGS. 6A and 6B show the dosing station 23 that doses particulate material 17 into each of the containers 9 of the consumable units 4.

The dosing station 23 includes a machine tray support 29 that comprises rails 30 to support the machine tray 27 shown in FIG. 5A, along with a plurality of consumable units 4. The machine tray 27 can be inserted into the dosing station 23 by sliding the machine tray 27 onto the rails 30, which support opposing sides of the machine tray 27. The machine tray support 29 also includes a stop against which the machine tray 27 abuts when inserted into the machine tray support 29. The machine tray support 29 ensures that the machine tray 27, and the consumable units 4, are accurately and reliably positioned and supported within the dosing station 23.

The dosing station 23 may include a proximity switch that confirms that the machine tray 27 has been properly positioned on the machine tray support 29. An alignment pin may additionally or alternatively be provided to ensure correct positioning.

The dosing station 23 also includes a movable shelf 31, alternately referred to as platform 31. The movable shelf 31 is slidably mounted on pillars 33 via slide bearings 34 so that the movable shelf 31 can move up and down relative to the machine tray support 29, and relative to the machine tray 27 and consumable units 4. An actuator (not shown) can be provided to move the movable shelf 31, or it can be manually moved, for example by handles 32. The moveable shelf 31 is positioned above the machine tray support 29. The moveable shelf 31 includes a dosing mechanism 35 for dosing particulate material into the containers 9 of the consumable units 4 on the machine tray 27, as explained further below. The moveable shelf 31 can move between a disengaged position and an engaged position. In the engaged position the moveable shelf 31 is proximate to the machine tray 27 and consumable units 4, in a position for dosing particulate material 17 into the containers 9. In the disengaged position the moveable shelf 31 is spaced from the machine tray 27 and consumable units 4 so that the machine tray 27 can be inserted or removed from the machine tray support 29.

The dosing station 23, in particular the dosing mechanism 35, doses particulate material 17 into a plurality of the containers 9 on the machine tray 27 simultaneously, preferably the dosing station 23 doses particulate material 17 into all of the containers 9 on the machine tray 27 simultaneously.

Figure 7A:
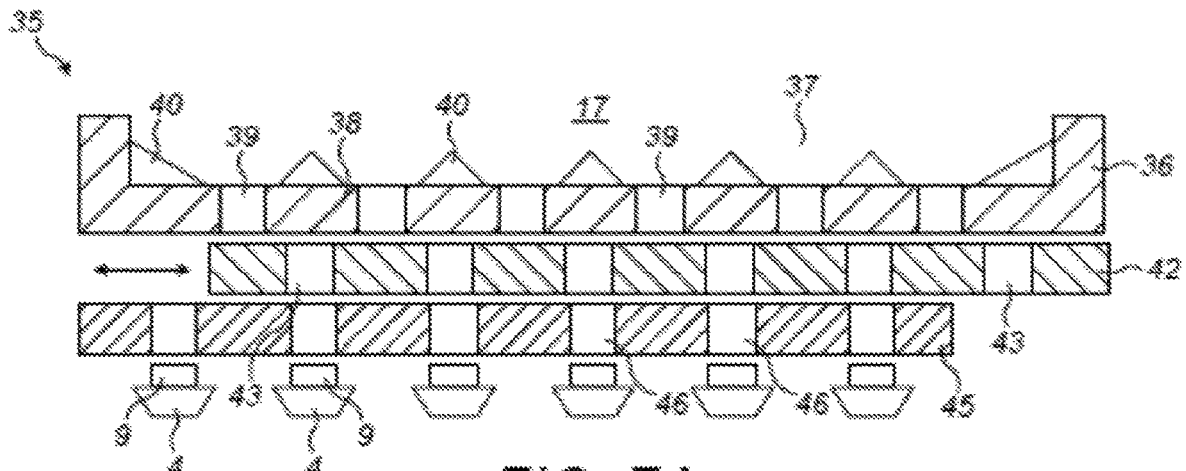
FIGS. 7A to 7C show a dosing mechanism of the dosing station of FIGS. 6A and 6B.
Figure 7B:
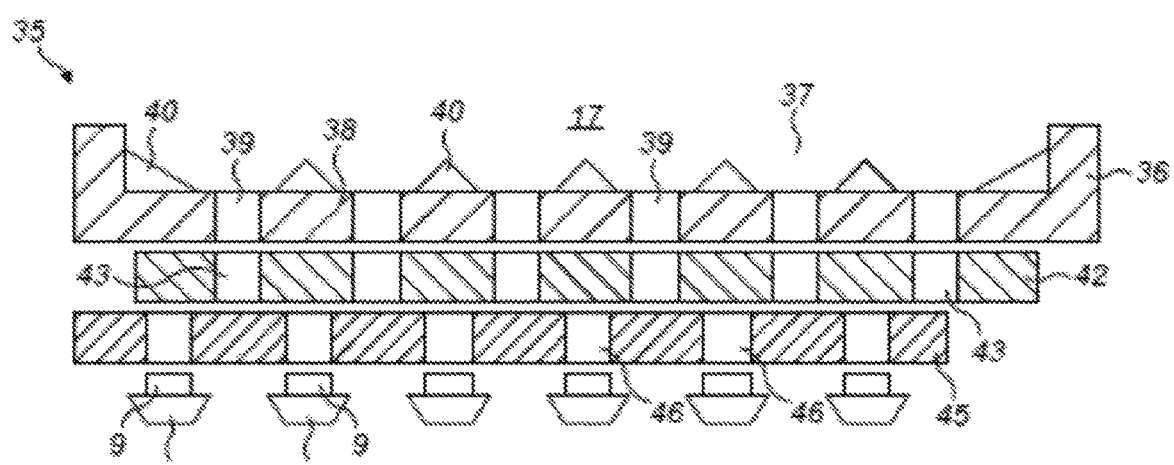
Figure 7C:
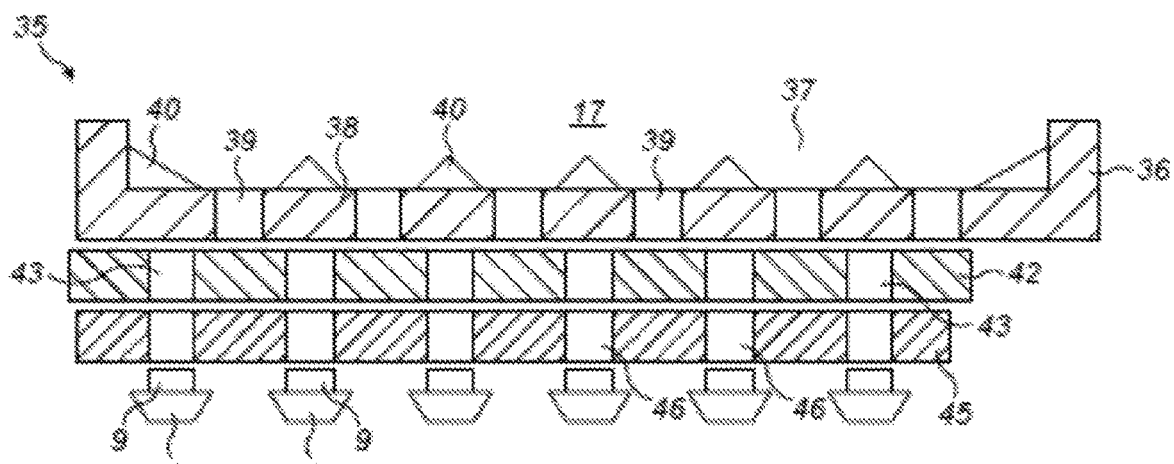

The dosing mechanism 35, shown in FIGS. 7A-7C, is embedded in the movable shelf 31, also visible in FIGS. 6A and 6B. As shown, the dosing mechanism 35 includes a hopper member 36 that includes a hopper 37 where particulate material 17 is received. The hopper 37 has a planar lower wall 38 that includes an array of openings 39 that extend through the lower wall 38. The array of openings 39 in the hopper 37 corresponds to the array of consumable units 4 being held in a machine tray 27, as shown in FIG. 5A. The hopper 37 includes sloped surfaces 40 between the openings 39 so that particulate material 17 is directed towards the openings 39. A vibrator 41, shown in FIG. 6B, may be attached to the hopper member 36 or the movable shelf 31 to vibrate the hopper member 36 and ensure that the particulate material 17 does not jam or bridge, and encourage the particulate material 17 to move into the openings 39.

The lower wall 38 of the hopper 37 is planar, and below the lower wall 38 is a doser, in this example a dosing plate 42. The dosing plate 42 is slidably mounted and can slide linearly between the positions shown in FIG. 7A and the position shown in FIG. 7C, via the position shown in FIG. 7B. The dosing plate 42 includes an array of dosing cavities 43 that correspond to the openings 39 in the hopper 37 and the array of consumable units 4 in the machine tray 27. An actuator 44 for moving the dosing plate 42 is shown in FIG. 6B. The actuator 44 is arranged to move the dosing plate 42 in the plane of the dosing mechanism 35 and movable shelf 31, parallel to the machine tray 27 held in the machine tray support 29 below the movable shelf 31.

An alignment member 45 is disposed below the dosing plate 42. The alignment member 45 also has an array of openings 46 that correspond to the openings 39 in the hopper 37, the dosing cavities 43 in the dosing plate 42, and the array of consumable units 4 in the machine tray 27. The openings 46 in the alignment member 45 are aligned with the containers 9 of the consumable units 4 in the machine tray 27, as shown in FIGS. 7A to 7C. The alignment member 45 is in a fixed position on the movable shelf 31 and does not move with the dosing plate 42. As shown, the openings 46 in the alignment member 45 are offset from the openings 39 in the hopper 37 so that, depending on the position of the dosing plate 42, the dosing cavities 43 in the dosing plate 42 are aligned either with the openings 39 in the hopper 37—as shown in FIG. 7B—or with the openings 46 of the alignment member 45—as shown in FIG. 7C—but cannot be aligned with both openings 39, 46 of the hopper 37 and alignment member 45 simultaneously.

In preferred embodiments, the alignment member 45 engages the containers 9 of the consumable units 4, in particular the ends 15 of the containers 9 where the stakes 18 are located, as shown in FIG. 3A. After the machine tray 27 is inserted into the machine tray support 29 the moveable shelf 31 can move downwards into the engaged position so that the alignment member 45 engages the containers 9. The lower side of each opening 46 in the alignment member 45 can comprise a recess to engage the containers 9. Preferably, the openings 46 are smaller (e.g. smaller diameter) than the containers 9, so that flow of the particulate material 17 is directed into the containers 9 and does not catch on an edge of the containers 9. Alternatively, the openings 46 in the alignment member 45 may be larger than the containers 9 so that the containers 9 are inserted into the openings 46. Alternatively, the alignment member 45 is positioned closely adjacent to the containers 9 in the engaged position of the movable shelf 31.

FIGS. 7A to 7C schematically illustrate the dosing mechanism 35. It will be appreciated that the plates (hopper plate 36, dosing plate 42, alignment member 45) would abut each other in use, or the plates 36, 42, 45 would be closely adjacent to each other, and so there would not be a gap as shown in FIGS. 7A to 7C.

Operation of the dosing mechanism 35 will now be described. FIG. 7A illustrates an initial position of the dosing plate 42 when the machine tray 27 and consumable units 4 are first inserted into the dosing station 23. As explained above, particulate material 17 is placed in the hopper 37 and moves down into the openings 39 due to gravity and optionally helped by vibrations from the vibrator 41. In the initial position of FIG. 7A the particulate material 17 is prevented from leaving the openings 39 in the hopper 37 by the dosing plate 42 because the dosing cavities 43 in the dosing plate 42 are not aligned with the openings 39 in the hopper 37.

Next, as shown in FIG. 7B, the dosing plate 42 is moved by the actuator (44, see FIG. 6B) so the dosing cavities 43 in the dosing plate 42 are aligned with the openings 39 in the hopper 37. In this position, the particulate material 17 can move down in the dosing cavities 43 in the dosing plate 42. It will be appreciated that the dosing cavities 43 in the dosing plate 42 will be completely filled with particulate material 17 from the hopper 37. Vibrations from the vibrator (41, see FIG. 6B) can ease and encourage movement of the particulate material 17 into the dosing cavities 43 of the dosing plate 42.

Once the dosing cavities 43 in the dosing plate 42 are filled with particulate material 17 the dosing plate 42 is moved to the position shown in FIG. 7C. In this position the dosing cavities 43 in the dosing plate 42 are aligned to the openings 46 in the alignment member 45, allowing the particulate material 17 to fall through the openings 46 in the alignment member 45 into the containers 9. In this way, particulate material 17 is dosed into the containers 9.

As the dosing plate 42 returns from the position shown in FIG. 7C to the position shown in FIG. 7A it passes the position shown in FIG. 7B, and some particulate material 17 may move into the dosing cavities 43 of the dosing plate 42. At the start of the next dosing process the dosing plate 42 is moved to the position of FIG. 7B, as described above. This arrangement may be advantageous as it ensures that a full dose of particulate material 17 is provided to the dosing cavities 43 of the dosing plate 42 as the dosing cavities 43 are exposed to the hopper 37 two times to fill with particulate material 17.

In an alternative arrangement the dosing plate 42 is moved between the position shown in FIG. 7B, where a dose of particulate material 17 is received in the dosing cavities 43, and the position shown in FIG. 7C, where the particulate material 17 is transferred to the consumable units 4 through the openings 46 in the alignment member 45. That is, the dosing plate 42 does not necessarily have to move to the position shown in FIG. 7A.

In some examples, the dosing plate 42 is moved a small distance from the position shown in FIG. 7C, and then moved back to the position shown in FIG. 7C. This action can ensure that the particulate material 17 is shaken or tapped out of the dosing cavities 43 in the dosing plate 42. The dosing plate 42 may be tapped against a hard stop to tap out the particulate material 17. Such a tapping action may be beneficial if the particulate material 17 includes tobacco, as particulate tobacco material can have variable particle size, can be sticky and can be liable to clumping.

The volume of each dosing cavities 43 in the dosing plate 42 may match the volume of particulate material 17 to be dosed into each container 9 of the consumable units 4. In this way, one movement cycle of the dosing plate 42 provides the desired dose of particulate material 17 to each consumable unit 4. Alternatively, the volume of each dosing cavities 43 in the dosing plate 42 may be a half of the volume of particulate material 17 to be dosed into each container 9 of the consumable units 4, and the dosing process repeated twice for each tray of consumable units 4 inserted into the dosing station 23. In other examples, the volume may be one third or one quarter, requiring three or four doses, respectively. The thickness of the dosing plate 42 can be changed to provide different volume of dose.

In some examples, the size (e.g. diameter) of the dosing cavities 43 is larger than the size (e.g. diameter) of the openings 39 in the hopper 37. This can prevent any edges of the dosing plate 42 impeding flow of particulate material 17 into the dosing cavities 43. Similarly, the openings 46 in the alignment member 45 can be larger (e.g. have a larger diameter) than the dosing cavities 43, so that flow of particulate material 17 from the dosing cavities through the openings 46 in the alignment member 45 is not impeded.

In some examples, the number of openings 39, dosing cavities 43 and openings 46 is doubled, and they are arranged at half pitch of the movement of the dosing plate 42 between the position shown in FIG. 7B and the position shown in FIG. 7C. In this way, there are two sets of openings 39, dosing cavities 43 and openings 46 spaced one half pitch from each other. Therefore, when one set of openings 39, dosing cavities 43 and openings 46 is in the position shown in FIG. 7B, the other set of openings 39, dosing cavities 43 and openings 46 is in the position shown in FIG. 7C. In this way, more containers 9 can be dosed with particulate material 17 in fewer operations.

An inspection unit may be provided on the dosing station 23 for inspecting the consumable units 4 in the machine tray 27. In one example, an optical scanning system may take height measurements across the machine tray 27 as the machine tray 27 is removed from the dosing station 23 after dosing of particulate material 17, and an inspection system can determine the filling height of particulate material 17 in each container 9 to ensure that sufficient particulate material 17 has been dosed into each container 9.

Figure 8A:
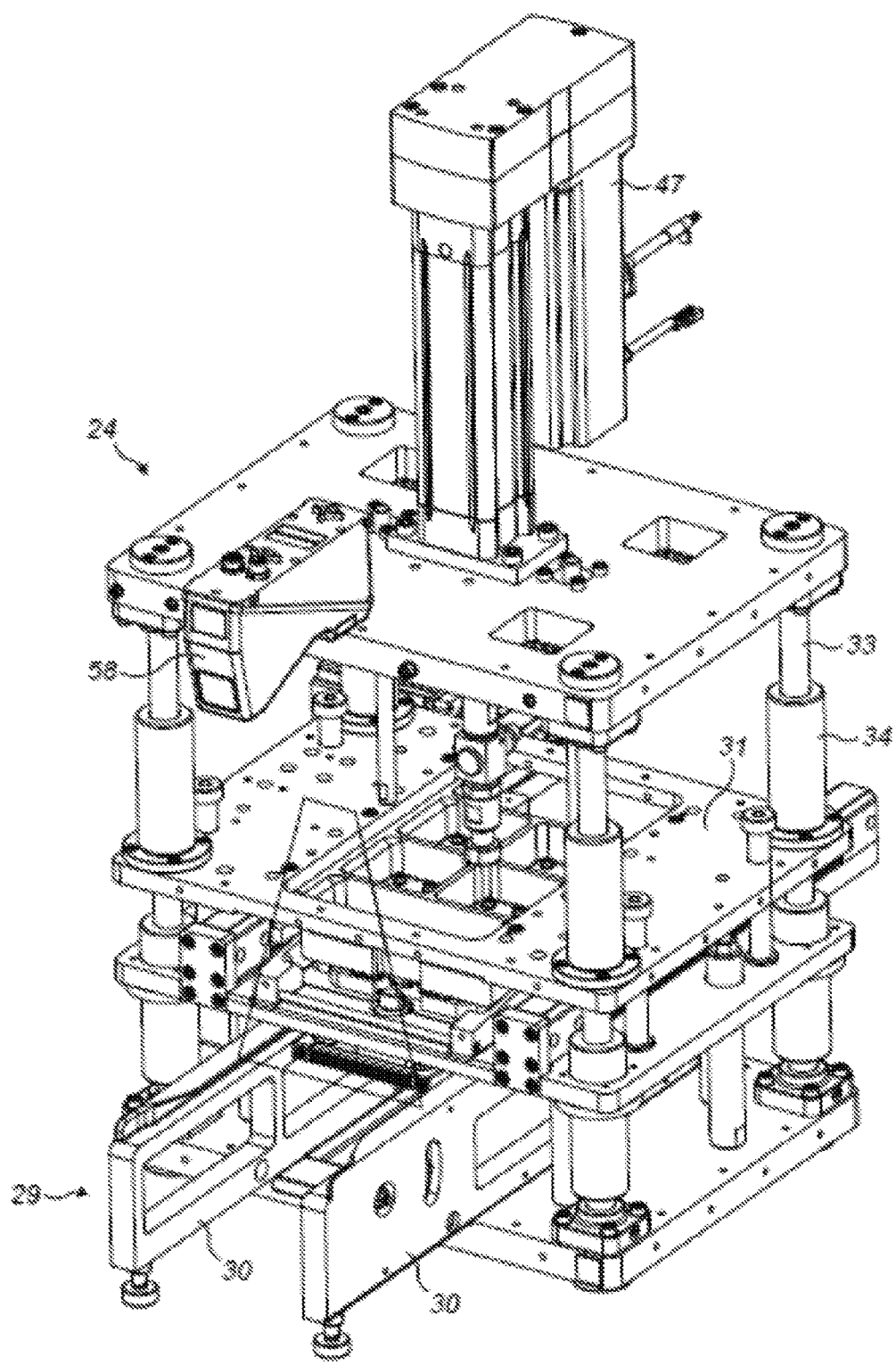
FIGS. 8A and 8B show a closure positioning station for positioning a closure on each consumable unit.
Figure 8B:
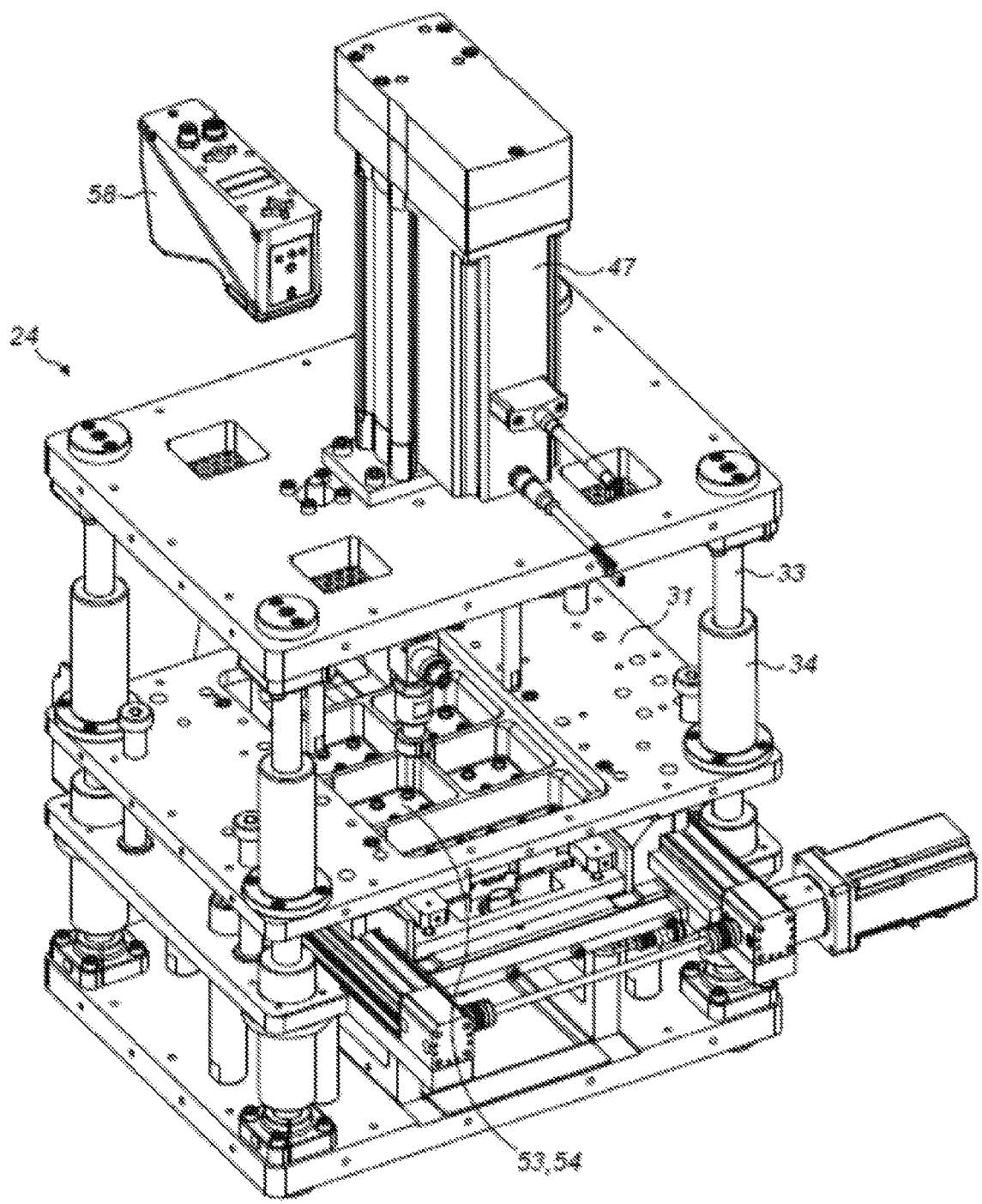

FIGS. 8A and 8B show the closure positioning station 24. The closure positioning station 24 positions a closure 14 on each consumable unit 4, on the lip 20 and between the stakes 18, as shown in FIG. 3A.

The closure positioning station 24 includes a machine tray support 29 similar to the machine tray support 29 of the dosing station 23, described above. In particular, the machine tray support 29 comprises rails 30 to support the machine tray 27 shown in FIG. 5A, along with a plurality of consumable units 4. The machine tray 27 can be inserted into the closure positioning station 24 by sliding the machine tray 27 onto the rails 30, which support opposing sides of the machine tray 27. The machine tray support 29 also includes a stop against which the machine tray 27 abuts when inserted into the machine tray support 29. The machine tray support 29 ensures that the machine tray 27, and the consumable units 4, are accurately and reliably positioned and supported within the closure positioning station 24.

The closure positioning station 24 may include a proximity switch that confirms that the machine tray 27 has been properly positioned on the machine tray support 29. An alignment pin may additionally or alternatively be provided to ensure correct positioning.

The closure positioning station 24 also comprises a movable shelf 31 similar to the movable shelf 31 of the dosing station 23. In particular, the movable shelf 31 is slidably mounted on pillars 33 via slide bearings 34 so that the movable shelf 31 can move up and down relative to the machine tray support 29, and relative to the machine tray 27 and consumable units 4. An actuator 47 can be provided to move the movable shelf 31, or it can be manually moved, for example by handles. The moveable shelf 31 is positioned above the machine tray support 29.

The moveable shelf 31 of the closure positioning station 24 includes a closure positioning mechanism 48 that positions a closure 14 on each container 9 on the machine tray 27, as explained further below. The moveable shelf 31 can move between a disengaged position and an engaged position. In the engaged position the moveable shelf 31 is proximate to the machine tray 27 and consumable units 4, in a position for positioning a closure 14 on each container 4. In the disengaged position the moveable shelf 31 is spaced from the machine tray 27 and consumable units 4 so that the machine tray 27 can be inserted into and removed from the machine tray support 29.

Figure 9:
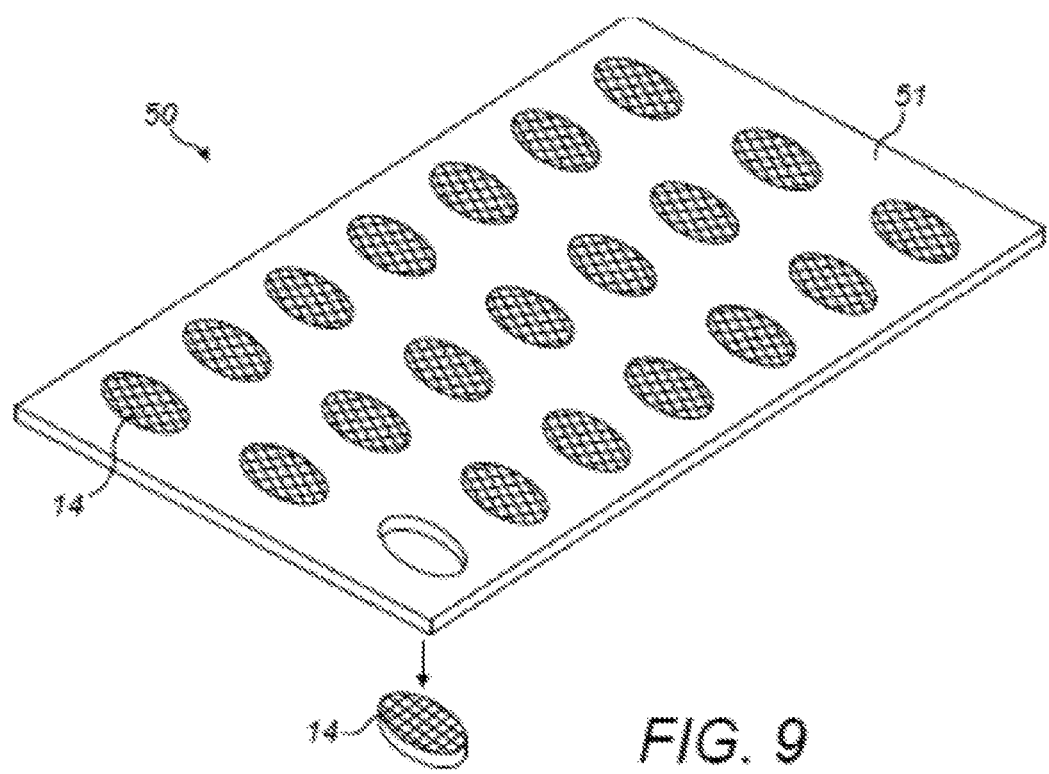
FIG. 9 shows a closure support web for use with the closure positioning station of FIGS. 8A and 8B.

Closures 14 are provided to the closure positioning station 24 in a closure support web 50, shown in FIG. 9. The closure support web 50 comprises a support structure 51 and a plurality of closures 14 arranged in an array. The closures 14 are removably attached to the support structure 51, for example via connecting tabs. As shown, individual closures 14 can be removed from the closure support web 50 by pushing a closure 14 out of the plane of the closure support web 50.

Preferably, the connecting tabs that attach the closures 14 to the support structure 51 are configured to break at the closure 14, rather than at the support structure 51. Therefore, when a closure is removed from the closure support web 50 the connecting tabs remain on the support structure. In one example, the connecting tabs are narrower at the closure than at the support structure 51.

Figure 10:
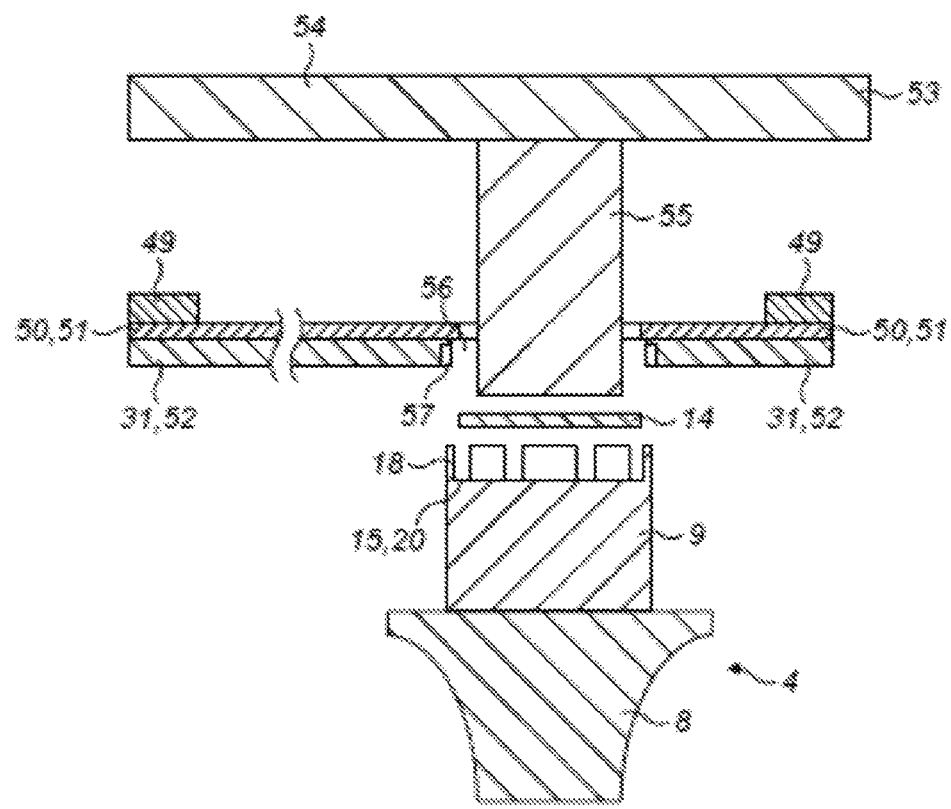
FIG. 10 shows a punch of the closure positioning station of FIGS. 8A and 8B.

The movable shelf 31 of the closure positioning station 24 includes a support surface 52 and a clamp 49 that together hold the closure support web 50, as shown in FIG. 10. The support surface 52 and the clamp 49 of the movable shelf 31 holds the closure support web 50 in a position above the consumable units 4 in the machine tray 27, such that a closure 14 in the closure support web 50 is aligned with each consumable unit 4 in the machine tray 27.

In a preferred example, the movable shelf 31 includes alignment pins that engage with holes in the closure support web 50 as the movable shelf 31 moves towards the consumable units 4. Alternatively, the support web 50 may comprise alignment pins that engage with holes in corresponding apertures on the movable shelf 31 as the movable shelf 31 moves towards the consumable units 4. In either example alignment is ensured between the closures 14 and the containers 9 of the consumable units 4.

The closure positioning station 24 also includes a punch 53 arranged to push closures 14 from the closure support web 50 into the consumable units 4, as shown in FIG. 10. The punch 53 comprises an actuator that moves a punch head 54 in a longitudinal direction toward the machine tray 27. The punch head 54 comprises a plurality of protrusions 55 arranged in an array that matches the array of closures 14 in the closure support web 50, and also matches the arrangement of the consumable units 4 in the machine tray 27. To match the example machine tray 27 and support web 50 illustrated by FIGS. 5a and 9, respectively, the array of protrusions may be a 3 by 7 array (an array of three columns and seven rows of protrusions). The protrusions 55 push the closures 14 out of the closure support web 50 and into the consumable units 4. In this way, one movement of the punch head 54 can position a closure 14 in each of the consumable units 4 simultaneously.

In a preferred example, a closure support web 50 comprises two or more sets of closures 14, and after moving one set of closures 14 into the consumable units 4, the closure support web 50 is moved to align the other set of closures 14 with the next machine tray 27 of consumable units 4. This has the advantage of reducing the number of times the closure support web 50 needs to be replaced. It shall be appreciated that the number of closures 14 in each set is equal to the number of supporting recesses 28 in the machine tray 27.

As illustrated in FIG. 10, each protrusion 55 on the punch head 54 contacts a closure 14 in the closure support web 50 as the actuator or manual operator moves the punch head 54 down, towards the consumable units 4. Movement of the punch head 54 separates the closure 14 from the closure support web 50 and pushes the closure 14 into the consumable unit 4. As explained previously with reference to FIG. 3A, the container 9 of each consumable unit 4 includes an end face 15 that defines a lip 20 and stakes 18 that protrude from the end 15. The closure 14 is positioned between the stakes 18, resting on the lip 20, as shown in FIG. 3A.

As shown in FIG. 10, the support surface 52 of the movable shelf 31 provides support below the closure support web 50, on the opposite side to the punch head 54. The support surface 52 may extend under the closure support web 50 only to the extent necessary to allow the clamp 49 to hold the closure support web 50 in position or, alternatively, the support surface 52 may extend further under the closure support web and include an array of openings 56 for the individual closures 14 to move through as the punch 53 pushes them from the closure support web 50 into the consumable units 4. Preferably, each protrusion 55 on the punch head 54 has a size and shape closely matched to the size and shape of the closures 14 and the openings 56 in the support surface 52 to help prevent flexing and movement of the closure support web 50 and closures 14 during operation.

Figure 14:
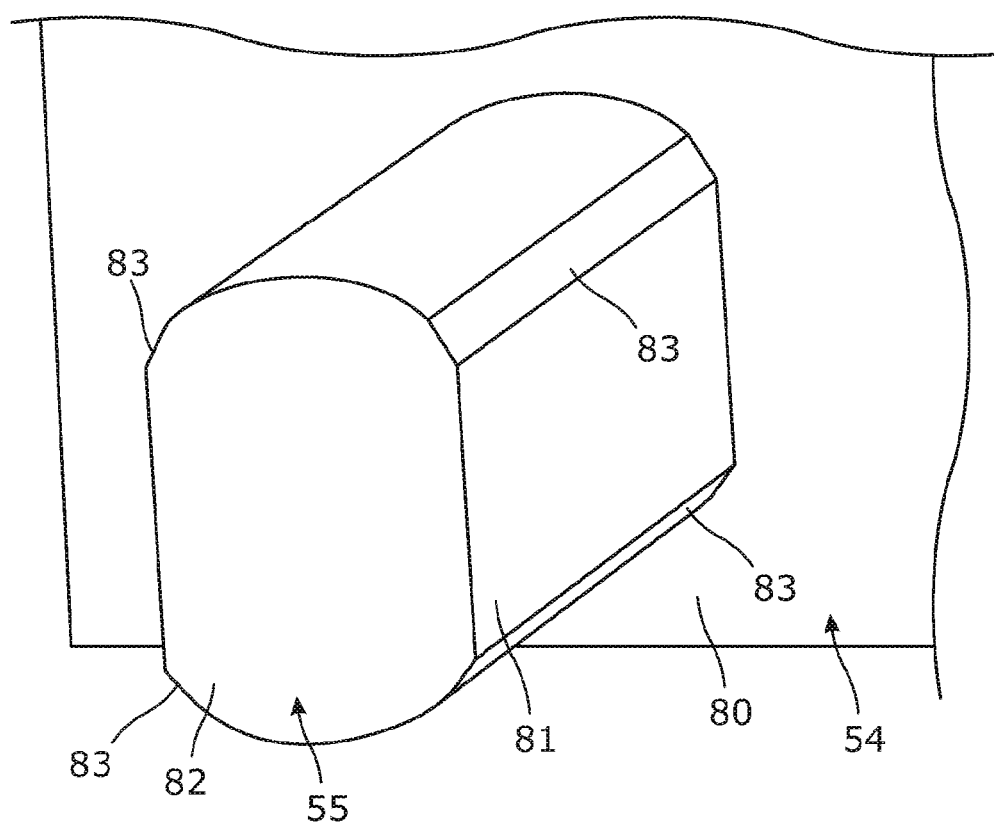
FIG. 14 shows a detail view of an example protrusion of a punch head.

An example protrusion 55 of the array of protrusions is shown in FIG. 14. The protrusion 55 extends from a planar surface 80 of the punch head 54. The protrusion 55 comprises a perimeter surface 81 and an end surface 82. The perimeter surface 81 extends between the planar surface 80 of the punch head 54 and the end surface 82. The perimeter surface 81 comprises cutting surfaces 83. The cutting surfaces 83 are regions of the perimeter surface 81 which are machined to a much tighter tolerance than the remainder of the perimeter surface 81 to achieve a tighter clearance between the cutting surfaces 83 and the openings 56 in the support surface 52. The cutting surfaces 83 are configured to align with the connecting tabs holding the closures 14 in the support web 50 so that, in use, when the protrusions 55 pass through the openings 56, the cutting surfaces 83 engage the connecting tabs to break the connecting tabs by shear with minimal deflection of the support web 50.

The support surface 52 may include an alignment element 57 to engage the containers 9 when the moveable shelf 31 is in the engaged position. In the example of FIG. 10, the alignment element 57 comprises a recess 57 in each opening 56 in the support surface 52. The recess 57 engages the containers 9, in particular the stakes 18, when the movable shelf 31 is in the engaged position. This can help to ensure alignment of the closures 14 and the containers 9 so that the closures 14 move smoothly from the closure support web 50 into the consumable units 4. In another example, the alignment element 57 comprises a chamfer that extends around the edge of the opening 56. Therefore, when the moveable shelf 31 is moved into the engaged position, any misalignment of the container 9 and the closure 14 is corrected by the chamfer which engages the stakes 18. In other embodiments, the alignment element may comprise an alignment pin configured to engage with the components to be punched, as discussed above.

Figure 15:
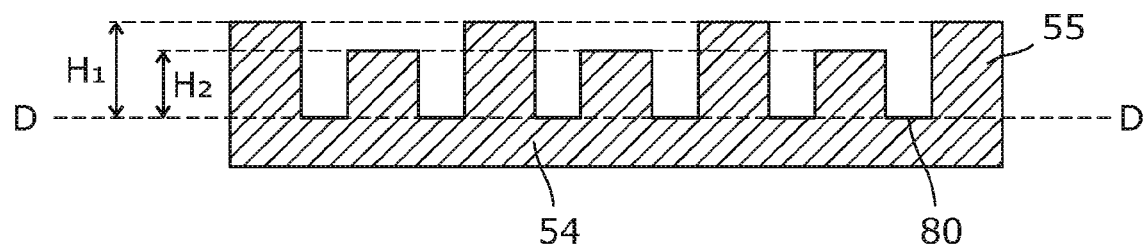
FIG. 15 shows an example punch head in section.
Figure 16:
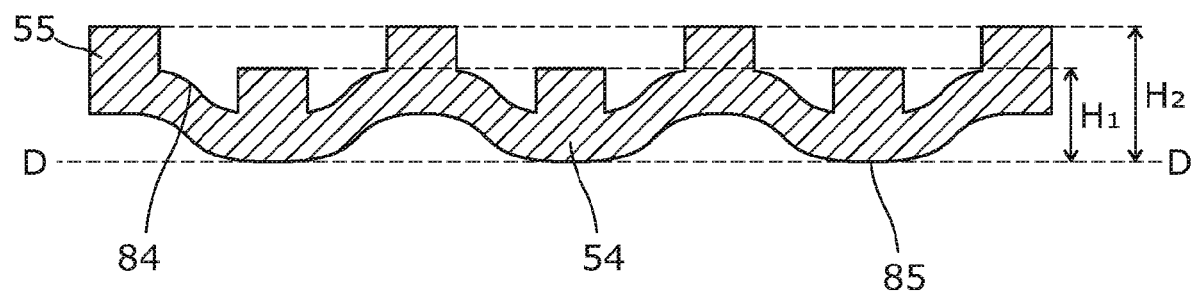
FIG. 16 shows another example punch head in section.

In one example, the height of the protrusions 55 vary to stagger engagement of the protrusions 55 with the individual closures 14 as the punch head 54 moves toward the machine tray 27. Herein, the height of the protrusions 55 is defined as the distance between the end surface 82 of the protrusion 55 and a datum plane D associated with the punch head 54. The datum plane D extends perpendicular to the direction of movement of the punch head 54 and parallel to the support web 50, when the support web 50 is correctly installed in the closure positioning station 24. In the example illustrated by FIG. 15, the datum plane D is coincident with the planar surface 80 of the punch head 54. The datum plane provides a planar reference point even in examples where the punch head 54 does not. For example, FIG. 16 illustrates a punch head 54 comprising a corrugated surface 84. Protrusions 55 of roughly equal length extend from peaks and valleys of the corrugated surface, but the heights of the protrusions 55 from the datum plane D vary to stagger engagement of the protrusions 55 with the individual closures 14 as the punch head 54 moves toward the machine tray 27. The datum plane in this example extends across a rear surface 85 of the punch head 54.

The protrusions 55 may be grouped according to height so that the protrusions of each group of protrusions 55 engages the closures 14 at the same time. In particular the group of protrusions 55 may comprise a first group of protrusions 55 having a first height and a second group of protrusions 55 having a second height, wherein the first height is greater than the second height. In other words, the end surfaces of the protrusions of the first group are at a first longitudinal position, and the end surfaces of the protrusions of the second group are at a second longitudinal position different to the first longitudinal position. Since the support web 50 is arranged perpendicular to the direction of movement of the punch head 54 and the protrusions 55 extend toward the support web 50 in the same direction as the direction of movement of the punch head 54, the first group of protrusions 55 will engage respective closures in the support web 50 before the second group of protrusions 55.

The first and second groups may be arranged to balance the force applied across the support web 50 and prevent a moment being applied to the linear actuator or the support web 50 when first group engages the closures 14. In the example illustrated by FIG. 15, there are two groups of two differently heighted protrusions 55 with the first group being positioned at oddly numbered rows or columns of the array of protrusions 55 and the second group being positioned at evenly numbered rows or columns. In another example, the protrusions 55 of each group alternate along any row or column of the array of protrusions, so that each protrusion 55 of one group has a protrusion 55 of the other group on either side—so that the two groups of protrusions 55 are arranged like the black and white tiles of a chessboard.

In another example, the first group of protrusions frames or encloses the second group of protrusions so that the first group represents a border region of the array and the second group represents a central region of the array, or vice versa. An arrangement in which one group borders the other group can allow the mean, or centroid, position of all of the protrusions of the first group to be substantially the same as the mean, or centroid position of the second group. This means that the mean, or centroid, point of force application for each group may be the same, which may allow a reduction in torsional variation in forces acting upon the punch that could cause wear.

It shall be appreciated that the exact pattern of the groups of protrusions 55 may vary, but that it is preferred that the two groups of differently heighted protrusions overlap—as opposed to having the first group arranged wholly on one side of the array and the second group arranged wholly on the other—which might otherwise set up a moment in the actuator or across the support web 50. Put another way, in each of the examples described above, a distribution of the first group of protrusions in the array of protrusions overlaps a distribution of the second group of protrusions in the array of protrusions, having the result that a contour encloses the first group of protrusions will necessarily overlap with a contour which encloses the second group of protrusions. It shall also be appreciated that in the illustrated examples, the groups of differently heighted protrusions extend from a common punch head 54.

By staggering the engagement of the protrusions 55 with the individual closures 14, the force required to displace the closures 14 from the support web 50 is reduced. The force required to simultaneously push out all the closures 14 from the support web 50 is divided by the number of groups; so two groups, for example, halves the required force. This prolongs the life of the punch head 54 and the actuator 47. It will be appreciated that there may be any number of groups of differently heighted protrusions 55 depending on the force and design requirements of the positioning station 24.

Similarly to the dosing station 23, as described previously, the closure positioning station 24 may comprise an inspection unit for inspecting the consumable units 4 in the machine tray 27 as they are removed from the machine tray support 29. As shown in FIGS. 8A and 8B, a scanner 58 may be positioned above the machine tray support 29 such that a laser/optical system of the scanner 58 can take height measurements across the machine tray 27 and the inspection system can check for the presence, and correct seating, of a closure 14 in each container 4.

Figure 11:
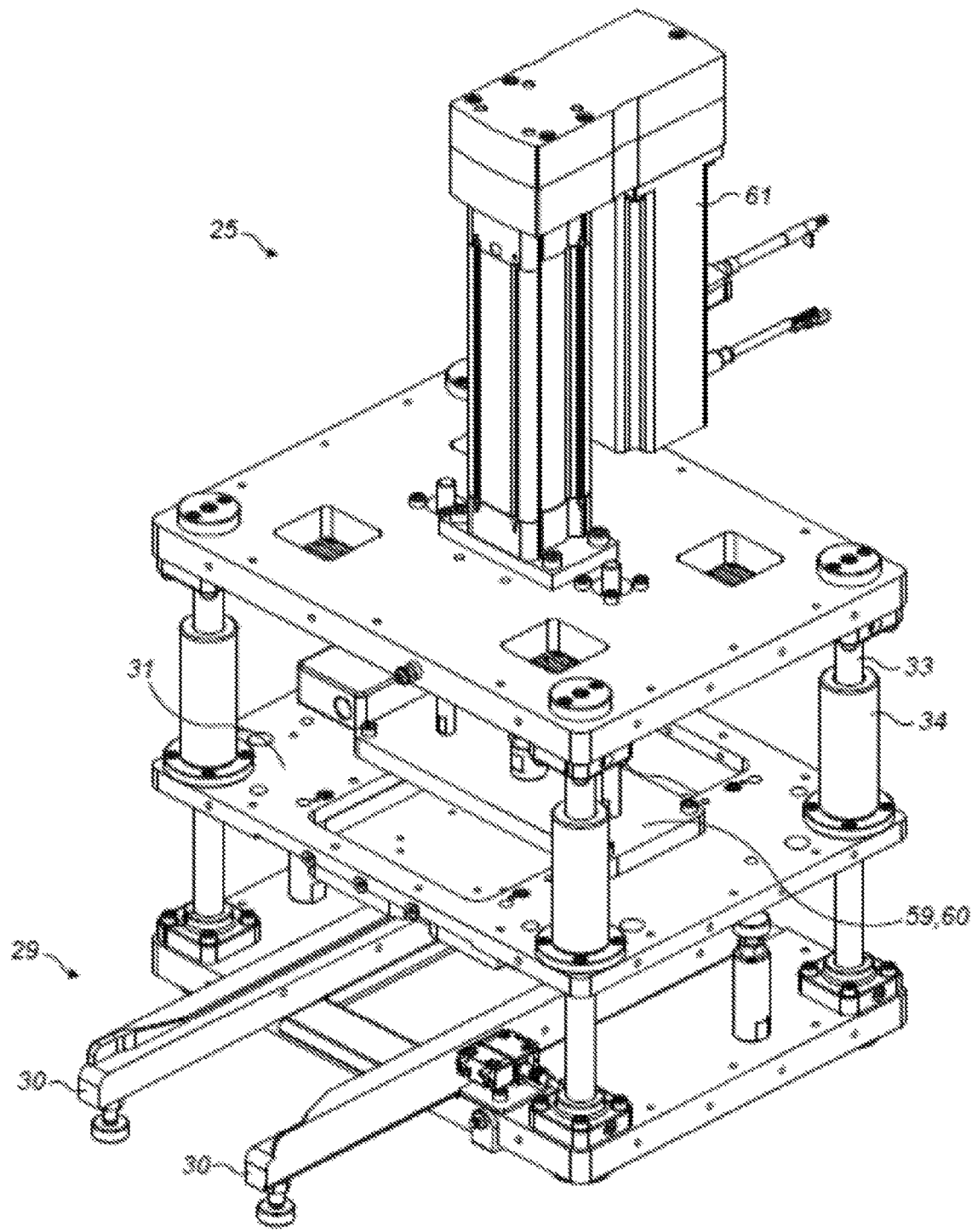
FIG. 11 shows a closure securing station for securing the closure to the consumable unit.

FIG. 11 illustrates the closure securing station 25. The closure securing station 25 secures the closures 14 to the consumable units 4 by bending over the stakes 18, as shown in FIGS. 2A and 2B.

The closure securing station 25 comprises a machine tray support 29 similar to the machine tray supports 29 of the dosing station 23 and the closure positioning station 24. In particular, the machine tray support 29 comprises rails 30 to support the machine tray 27 shown in FIG. 5A, along with a plurality of consumable units 4. The machine tray 27 can be inserted into the closure securing station 25 by sliding the machine tray 27 onto the rails 30, which support opposing sides of the machine tray 27. The machine tray support 29 also includes a stop against which the machine tray 27 abuts when inserted into the machine tray support 29. The machine tray support 29 ensures that the machine tray 27, and the consumable units 4, are accurately and reliably positioned and supported within the closure securing station 25.

The closure securing station 25 may include a proximity switch that confirms that the machine tray 27 has been properly positioned on the machine tray support 29. An alignment pin may additionally or alternatively be provided to ensure correct positioning.

As illustrated in FIG. 11, the closure securing station 25 comprises a press 59. The press 59 bends the stakes 18 of the container 9 over against the closure 14 to secure the closure 14 to the container 9, as shown in FIGS. 2A and 2B.

The closure securing station 25, as illustrated in FIG. 11, includes a movable shelf 31 similar to the movable shelves 31 of the dosing station 23 and the closure positioning station 24. In this example, the movable shelf 31 comprises a press head 60 of the press 59, described further below. The pillars 33 and slide bearings 34 of the movable shelf 31 guide the movable shelf 31 and press head 60, ensuring reliable and accurate operation of the press head 60. In other examples, the closure securing station 25 does not comprise a movable shelf 31, and the press head 60 is an independent component.

The press 59 comprises an actuator 61 that acts to move a press head 60 vertically, as shown in FIG. 11. The press head 60 has a plurality of individual presses arranged in an array matching the array of the consumable units 4 in the machine tray 27. In this way, multiple, or all, of the consumable units 4 can be processed simultaneously to bend the stakes 18 and secure the closures 14 to the consumable units 4.

In one example, the press head 60 comprises a first set of presses 62 for carrying out a first bending process, and a second set of presses 63 for carrying out a second bending process. The first and second sets of presses 62, 63 can each be arranged to occupy half of the press head 60. In an alternative arrangement, the first set of presses 62 is provided on a separate station to the second set of presses 63.

Figure 12:
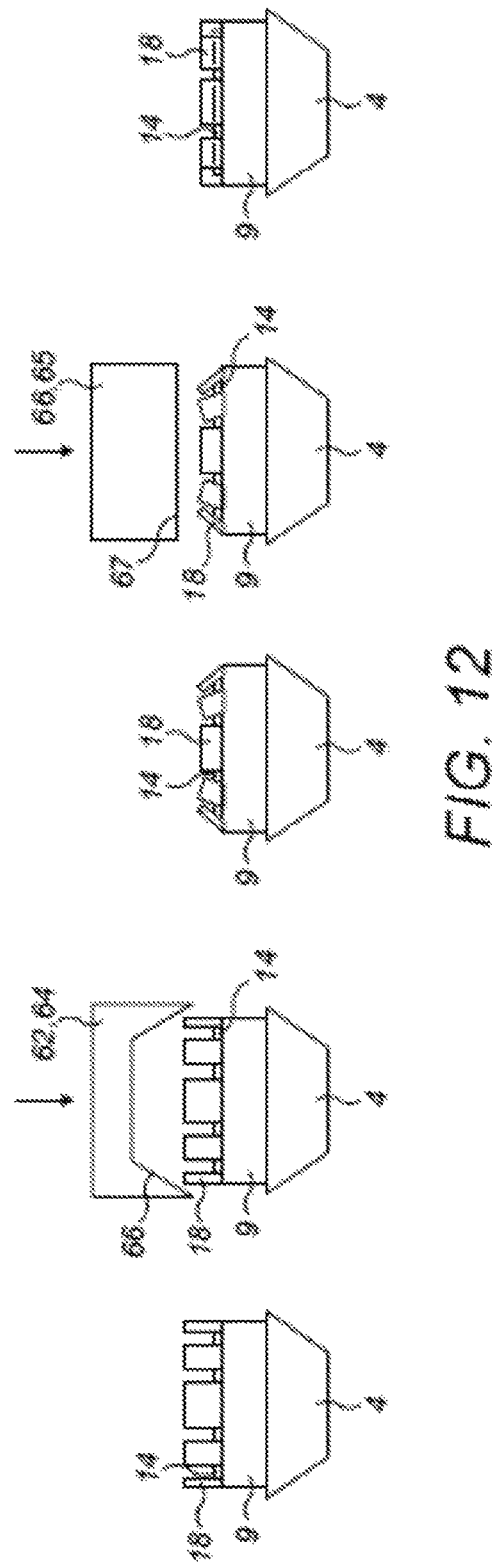
FIG. 12 shows a schematic diagram of operation of a first example of the closure securing station of FIG. 11.

FIG. 12 shows the sequence of the first set of presses 62 and the second sets of presses 63 bending the stakes 18 over against the closure 14, moving from left to right. FIG. 12 shows the consumable unit 4 as it is received in the closure securing station 25, with the stakes 18 extending upwards and the closure 14 received in between the stakes 18.

As shown, a first press 64 of the first set of presses 62 comprises an angled pressing face 66 that bends the stakes 18 over partly. In particular, in this example the angled pressing face 66 is angled at 45 degrees form the horizontal so that the stakes 18 are bent over by 45 degrees in the first bending process. However, it shall be appreciated that angles other than 45 degrees may be used for the angled pressing face 66, as long as the angle is less than about 80 degrees and greater than about 20 degrees. In some embodiments the pressing face 66 may be concave, meaning that the angle of the pressing face 66 from the horizontal changes across the width of the pressing face 66.

Subsequently, a second press 65 of the second set of presses 63 comprises a flat pressing face 67 that bends the stakes 18 over the remainder to lie against the closure 14 and secure it to the container 9.

The arrangement of first and second sets of presses 64, 65, which bends the stakes 18 in two stages, helps to ensure that the stakes 18 are reliably bent over without breaking them.

In some examples the first and/or second presses 64, 65 are heated, or the entire press head 60 is heated, to ease bending of the stakes 18. In some examples in which the closures 14 are metal or include metal, an induction heating system can be arranged to cause the closures 14 to heat up, which in turn heats the surrounding parts of the container 9, including the stakes 18. It will appreciated that this depends on the material of the container 9 and the stakes 18. For example, if the stakes 18 are made of a thermoplastic then heated presses may ease the bending process.

Figure 13:
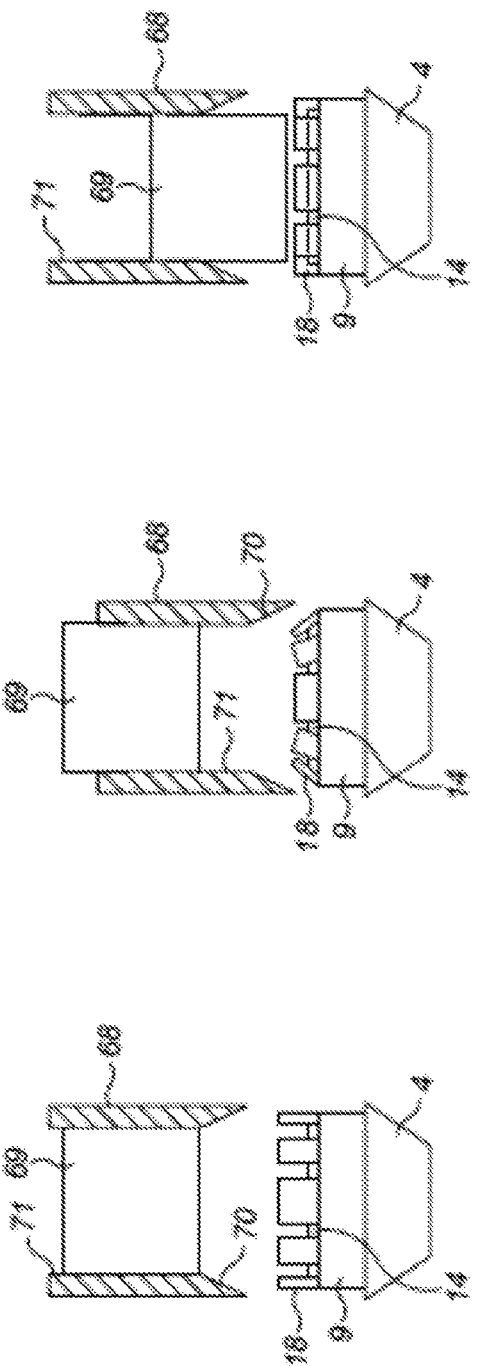
FIG. 13 shows a schematic diagram of operation of a second example of the closure securing station of FIG. 11.

FIG. 13 illustrates an alternative press in which a first press 68 and a second press 69 are arranged concentrically. As shown, in this example the first press 68 has an angled pressing face 70 and a central bore 71. Within the central bore 72 is the second press 69 that can move within the bore 71. In this way, as illustrated, the first press 68 can initially be moved to initiate bending of the stakes 18 by the angled pressing face 70. Subsequently, the second press 69 can be moved to bend the stakes 18 against the closure 14 to secure the closure to the container 9.

In the arrangement of FIG. 13 the press head 60 can comprise a first plate that comprises protrusions forming the first presses 68 and openings creating the bores 71 of the first presses 68, and a second plate can comprise protrusions forming the second presses 69 that extend through the openings in the first plate. The first and second plates can be arranged adjacent to each other and separate actuators can move the first and second plates to perform the process illustrated in FIG. 13. In this example, all of the consumable units 4 can be processed simultaneously by a single closure securing station 25.

In some examples the first and second presses 68, 69 are heated, or the entire press head 60 is heated, to ease bending of the stakes 18. It will appreciated that this depends on the material of the container 9, in particular the stakes 18. For example, if the stakes 18 are made of a thermoplastic then heated presses may ease the bending process.

In alternative arrangements, the closure securing station 25 may comprise alternative means for securing the closures 14 to the consumable units 4. For example, the closure securing station 25 may include a welding station, such as an ultrasonic welding station, that welds the closures 14 to the containers 9 of the consumable units 4. In other examples, the closure securing station 25 may comprise a press that pushes a closure 14 into the chamber 16 of the consumable unit 4 in a press fit to secure the closure 14 to the container 9 of the consumable unit 4.

Similarly to the dosing station 23 and the closure positioning station 24, as described previously, the closure securing station 25 may comprise an inspection unit for inspecting the consumable units 4 in the machine tray 27 as they are removed from the machine tray support 29. In particular, a scanner may be positioned above the machine tray support 29 such that a laser/optical system of the scanner can take height measurements across the machine tray 27, and the inspection system can check for the presence, and correct seating, of a closure 14 in each container 9 and the presence and correct positioning of the stakes 18, to ensure that the closures 14 are properly secured.

On removal from the closure securing station 25 manufacture of the consumable units 4 is complete. The consumable units 4 can then be removed from the machine tray 27 and moved on to packaging and distribution processes. The machine tray 27 can be returned to the beginning of the process and reused.

It will be appreciated that the dosing station 23, closure positioning station 24 and closure securing station 25 have many common features. For example, each station 24, 25, 26 includes a machine tray support 29, and a movable shelf 31 mounted on pillars 33 for vertical movement. This allows the stations 23, 24, 25 to be modularly arranged within larger apparatus, for example apparatus that packages the consumable units 4 and/or apparatus that assembles or forms the empty consumable units 4 illustrated in FIG. 3A.

It will also be appreciated that each of the dosing station 23, closure positioning station 24 and closure securing station 25 may be used for assembly of similar consumables where common assembly steps are required, with very little modification. For example, the support web 50 may be adapted to support an alternative assembly component. For example, the support web 50 is shown adapted to support heating elements for an aerosol generating device. The closure positioning station 24 can be simply modified to position the heater elements by adapting a machine tray 27 to support heater sub-components. A corresponding adaptation may be made to the punch head to vary, for example, the spacing, shape and/or size of the protrusions 55 to provide a heater assembly station with the same features as the closure positioning station 24. For example, the support web 50 of heater elements is secured between the support surface 52 and the clamp 49. A corresponding machine tray 27 of heater sub components is positioned in the machine tray support 29 such that heating elements in the closure support web 50 are aligned with each heater sub component 4 in the machine tray 27. The punch 53 is arranged to push the heating elements from the support web 50 into the heater sub-assemblies 4 held in the machine tray 27 in the exact same way that the punch 53 pushes the individual closures from the support web in the closure positioning station. The protrusions 55 of the punch 53 may be arranged substantially as described above with reference to the closure positioning station 24, but are spaced and sized to correspond to the spacing and size of the heater elements in the support web 50. As with the closure positioning station 24, the height of the protrusions 55 may vary to stagger engagement of the protrusions 55 with the heater elements as the punch head 54 moves toward the machine tray 27.

Most generally, the punch head 54 having differently heighted protrusions may be applied to any arrangement in which sub components are to be punched from a support web 50. The size, shape and spacing of the protrusions are adapted accordingly to correspond with the size, shape and spacing of the components provided in the support web 50.

As used herein, the term "aerosolizable material" means that, when heated, the aerosolizable material produces an aerosol. For example, the aerosolizable material may be or comprise a flavour substrate. The flavour substrate may comprise flavour, such as tobacco flavour or other flavour and/or may comprise glycerol or other additives or enhancers alternatively or additionally to glycerol. The flavour substrate, with or without glycerol or other additives, may be heated to produce an aerosol.

It may be noted that, in general, an aerosol is a colloid of fine solid particles or liquid droplets, in air or another gas, where a colloid is a substance in which microscopically dispersed insoluble particles are suspended throughout another substance. On the other hand, a vapor is a substance in the gas phase at a temperature lower than its critical temperature, which means that for example the vapor can be condensed to a liquid by increasing its pressure without reducing the temperature. It is to be understood that as used herein the term aerosol includes aerosol and/or vapor.

As explained previously, the aerosolizable material may comprise tobacco. For example, the aerosolizable material may be a particulate tobacco material.

As used herein, the terms "tobacco", or "particulate tobacco material", mean a material that includes tobacco, tobacco derivatives, expanded tobacco, reconstituted tobacco, or tobacco substitutes. The particulate material may also include a non-tobacco material. In some examples, the "particulate material" is powder-like, and in alternative examples the "particulate material" is formed by cutting of shredding a material into smaller particles. In some examples, the "particulate tobacco material" may include a so-called 'cut rag', which is formed by shredding or cutting tobacco into small particles. The particulate tobacco material may be produced by extruding a tobacco slurry and cutting the extruded material into particles.

It will be appreciated that the above described examples of a consumable unit may be used in devices other than the inhalation device described with reference to FIG. 1. For example, the inhalation device may be a device that releases compounds from the particulate material without burning, such as tobacco heating products. In one embodiment the inhalation device is a heating device which releases compounds by heating, but not burning, a substrate material, for example the particulate material. The particulate material may be for example tobacco or other non-tobacco products, which may or may not contain nicotine. In one embodiment the inhalation device is a tobacco heating device.

In another embodiment the tobacco industry product is a hybrid system to generate aerosol by heating, but not burning, a combination of substrate materials, for example the contents of the atomizer cartridge and the particulate material in the consumable unit. The substrate materials in the atomizer cartridge, and the particulate material in the consumable unit, may comprise for example solid, liquid or gel which may or may not contain nicotine. In one embodiment, the hybrid system comprises a liquid or gel substrate and a solid substrate. The solid substrate may be for example tobacco or other non-tobacco products, which may or may not contain nicotine. In one embodiment the hybrid system comprises a liquid or gel substrate and tobacco.

In order to address various issues and advance the art, the entirety of this disclosure shows by way of illustration various embodiments in which the claimed invention(s) may be practiced and provide for superior method and apparatus for manufacturing a consumable unit for use with an inhalation device. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future.

The invention claimed is:

1. A punch having an array of protrusions configured to engage an array of sub components in a support web by displacement of the punch toward the support web to separate the sub components from the support web,
wherein the protrusions comprise a first protrusion having a first height and a second protrusion having a second height, the second height being greater than the first height, so that the second protrusion engages a sub component before the first protrusion engages a sub component when the punch moves toward the support web,
wherein the protrusions comprise a first group of protrusions having a first height and a second group of protrusions having a second height, the second height being greater than the first height, and
wherein the distribution of the first group of protrusions at least partially encloses at least one protrusion of the second group of protrusions, or alternatively wherein the distribution of the second group of protrusions at least partially encloses at least one of the protrusions of the first group of protrusions.

2. Apparatus for positioning a sub component on a consumable unit for use with an inhalation device, the apparatus comprising:
a machine tray support for locating a machine tray of consumable units, the consumable units being arranged in an array in the machine tray;
a clamp for holding a support web comprising an array of sub components in a position above the machine tray support; and
the punch of claim 1.

3. The apparatus of claim 2, further comprising an actuator arranged to move the punch toward the machine tray support.

4. The apparatus of claim 2, wherein the clamp is provided on a platform, the platform being slidably mounted relative to the machine tray support between an engaged position and a disengaged position, in which a machine tray is insertable into, or is removable from, the machine tray support.

5. The apparatus of claim 4, wherein the clamp comprises a support surface having an array of apertures that correspond to the array of protrusions, so that, the protrusions are moveable into the apertures to separate sub components from a support web held by the clamp by pushing the sub components through the apertures.

6. The apparatus of claim 5, wherein the support surface comprises an alignment element associated with each aperture, each alignment element being configured to engage a corresponding consumable unit or the machine tray to adjust for any misalignment between the consumable unit and a corresponding sub component of the support web when the platform is in the engaged position.

7. The apparatus of claim 6, wherein each alignment element comprises a chamfer of a lower edge of each aperture.

8. The apparatus of claim 4, wherein the platform is mounted on a pillar for linear movement between the engaged and disengaged positions.

9. The apparatus of claim 8, wherein the platform is supported by four pillars arranged around the machine tray support.

10. The apparatus of claim 9, wherein the machine tray support comprises one or more rails configured to support opposing sides of the machine tray so that the machine tray can be inserted into the machine tray support by sliding the machine tray along said rails.

11. The apparatus of claim 10, wherein the machine tray support includes a stop against which the machine tray abuts when inserted into a predetermined position.

12. The apparatus of claim 4, further comprising an actuator arranged to move the punch toward the machine tray support; wherein the actuator is configured to move the platform between the engaged and disengaged positions.

13. The apparatus according to claim 2, wherein a distribution of the first group of protrusions in the array of protrusions overlaps a distribution of the second group of protrusions in the array of protrusions.

14. The apparatus according to claim 13, wherein the array of protrusions comprises rows of protrusions and wherein each row of protrusions differs in height from a directly adjacent row.

15. The apparatus according to claim 2, wherein the distribution of the first group of protrusions at least partially encloses at least one protrusion of the second group of protrusions, or alternatively wherein the distribution of the second group of protrusions at least partially encloses at least one of the protrusions of the first group of protrusions.

16. A method of positioning a sub component on a consumable unit for use with an inhalation device, the method comprising:
locating a machine tray of consumable units a machine tray support, the consumable units being held in an array in the machine tray;
clamping a support web comprising an array of sub components in a position above the machine tray support; and
operating the punch of claim 1 by displacing of the punch toward the machine tray support to separate the sub components from the support web and locate the sub components on the consumable units held in the machine tray.

* * * * *